US011697747B2

(12) United States Patent
Reuter et al.

(10) Patent No.: US 11,697,747 B2
(45) Date of Patent: Jul. 11, 2023

(54) METHOD OF PREPARATION OF AQUEOUS POLYURETHANE-POLYUREA DISPERSION AND AQUEOUS BASE PAINT CONTAINING SAID DISPERSION

(71) Applicant: BASF Coatings GmbH, Muenster (DE)

(72) Inventors: Hardy Reuter, Muenster (DE); Matthias Blohm, Muenster (DE); Bernhard Steinmetz, Ruetschenhausen (DE); Peggy Jankowski, Guentersleben (DE); Dirk Eierhoff, Muenster (DE); Thomas Zihang, Sendenhorst (DE)

(73) Assignee: BASF COATINGS GMBH, Münster (DE)

( * ) Notice: Subject to any disclaimer, the term of this patent is extended or adjusted under 35 U.S.C. 154(b) by 322 days.

(21) Appl. No.: 17/025,139

(22) Filed: Sep. 18, 2020

(65) Prior Publication Data
US 2021/0002509 A1 Jan. 7, 2021

Related U.S. Application Data

(62) Division of application No. 15/534,048, filed as application No. PCT/EP2015/076683 on Nov. 16, 2015, now Pat. No. 10,836,927.

(30) Foreign Application Priority Data

Dec. 9, 2014 (EP) .................................... 14196881

(51) Int. Cl.
C09D 175/04 (2006.01)
C08G 18/75 (2006.01)
B05D 7/14 (2006.01)
C08G 18/10 (2006.01)
C09D 5/00 (2006.01)
C08G 18/66 (2006.01)
C08G 18/08 (2006.01)
C08G 18/42 (2006.01)
C08G 18/76 (2006.01)
B05D 7/00 (2006.01)
C08G 18/24 (2006.01)
C08G 18/80 (2006.01)

(52) U.S. Cl.
CPC ............ C09D 175/04 (2013.01); B05D 7/14 (2013.01); B05D 7/572 (2013.01); C08G 18/0823 (2013.01); C08G 18/10 (2013.01); C08G 18/242 (2013.01); C08G 18/4233 (2013.01); C08G 18/6659 (2013.01); C08G 18/755 (2013.01); C08G 18/758 (2013.01); C08G 18/7642 (2013.01); C08G 18/80 (2013.01); C09D 5/002 (2013.01)

(58) Field of Classification Search
None
See application file for complete search history.

(56) References Cited

U.S. PATENT DOCUMENTS

| 4,292,226 A | 9/1981 | Wenzel |
| 4,408,008 A | 10/1983 | Markusch |
| 4,569,966 A | 2/1986 | Piccirilii et al. |
| 4,829,122 A | 5/1989 | Pedain |
| 6,586,523 B1 | 7/2003 | Blum |
| 2006/0292306 A1 | 12/2006 | Goebel |
| 2018/0002476 A1 | 1/2018 | Reuter |

FOREIGN PATENT DOCUMENTS

| DE | 31 37 748 A1 | 3/1983 |
| DE | 35 13 248 A1 | 11/1985 |
| DE | 40 09 858 A1 | 10/1991 |

(Continued)

OTHER PUBLICATIONS

International Preliminary Report on Patentability and Written Opinion for PCT Application No. PCT/EP2015/076683, dated Jun. 22, 2017, (with English translation).

(Continued)

Primary Examiner — Francisco W Tschen
(74) Attorney, Agent, or Firm — Armstrong Teasdale LLP

(57) ABSTRACT

The present invention relates to an aqueous polyurethane-polyurea dispersion (PD) having polyurethane-polyurea particles, present in the dispersion, having an average particle size of 40 to 2000 nm, and having a gel fraction of at least 50%, obtainable by (I) preparing a composition (Z) comprising based each case on the total amount of the composition (Z), (Z.1) 15 to 65 wt % of at least one intermediate containing isocyanate groups and having blocked primary amino groups, its preparation comprising the reaction (Z.1.1) of at least one polyurethane prepolymer containing isocyanate groups and comprising anionic groups and/or groups which can be converted into anionic groups, with (Z.1.2) at least one polyamine comprising at least two blocked primary amino groups and at least one free secondary amino group, by addition reaction of isocyanate groups from (Z.1.1) with tree secondary amino groups from (Z.1.2), (Z.2) 35 to 85 wt % of at least one organic solvent which possesses a solubility in water, of not more than 38 wt % at a temperature of 20° C., (II) dispersing the composition (Z) in aqueous phase, and (III) at least partly removing the at least one organic solvent (Z.2) from the dispersion obtained in (II), The present invention also relates to basecoat materials comprising the dispersion (PD), and to multicoat paint systems produced using the basecoat materials.

15 Claims, No Drawings

(56) References Cited

FOREIGN PATENT DOCUMENTS

| | | |
|---|---|---|
| DE | 44 37 535 A1 | 4/1996 |
| DE | 197 19 924 A1 | 11/1998 |
| DE | 197 19 925 A1 | 11/1998 |
| DE | 199 22 377 A1 | 11/2000 |
| DE | 199 48 004 A1 | 7/2001 |
| DE | 100 43 405 C1 | 6/2002 |
| DE | 102 38 349 A1 | 3/2004 |
| EP | 1 534 792 A1 | 6/2005 |
| EP | 1 736 246 A1 | 12/2006 |
| EP | 1389627 | 10/2008 |
| JP | 4-13782 A | 1/1992 |
| JP | 8-283612 A | 10/1996 |
| JP | 10-36807 A | 2/1998 |
| WO | WO 91/15528 A1 | 10/1991 |
| WO | WO 92/15405 A1 | 9/1992 |
| WO | WO 2012/160053 A1 | 11/2012 |
| WO | WO 2014/007915 A1 | 1/2014 |

OTHER PUBLICATIONS

International Search Report and Written Opinion for PCT Application No. PCT/EP2015/076683, dated Feb. 18, 2016, 10 pages.
Declaration under 37 CSFR Section 1.132 by Hardy REUTER for U.S. Appl. No. 15/534,097, filed Aug. 5, 2019 (Year: 2009).
DE 19719925 A1 Google Patent Translation, Retrieved on Dec. 27, 2018, Filed on May 13, 1997. (Year 1997).

METHOD OF PREPARATION OF AQUEOUS POLYURETHANE-POLYUREA DISPERSION AND AQUEOUS BASE PAINT CONTAINING SAID DISPERSION

CROSS-REFERENCE TO RELATED APPLICATIONS

This application is divisional application of U.S. application Ser. No. 15/534,048, allowed, which is a National Stage entry under 35 U.S.C. § 371 of PCT/EP2015/076683, filed on Nov. 16, 2015, and claims priority to European Patent Application No. 14196881.8, filed on Dec. 9, 2014.

The present invention relates to an aqueous polyurethane-polyurea dispersion (PD) and also to a pigmented aqueous basecoat material comprising the dispersion (PD). The aqueous dispersion (PD) is obtainable by (I) preparing a specific composition (Z) comprising a specific intermediate containing isocyanate groups and also a specific solvent, (II) dispersing the composition (Z) in aqueous phase, and (III) at least partly removing the organic solvent from the dispersion obtained in (II). The present invention also relates to a process for preparing the stated dispersion, and also to the use of the dispersion, or of an aqueous basecoat material comprising the dispersion, for improving the performance properties of basecoat materials and coatings produced using the basecoat material. Especially in connection with the construction of multicoat paint systems, the dispersion (PD), and also the aqueous basecoat material comprising this dispersion, possess outstanding performance properties.

PRIOR ART

Multicoat paint systems on a wide variety of different substrates, as for example multicoat paint systems on metallic substrates within the automobile industry, are known. In, general, multicoat paint systems of this kind comprise, viewed from the metallic substrate outward, an electrocoat, a layer which has been applied directly to the electrocoat and is usually referred to as the primer-surfacer coat, at least one coat which comprises color pigments and/or effect pigments and is generally referred to as the basecoat, and a clearcoat. The basic compositions and functions of these layers and of the coating compositions needed to form these layers, i.e. electrocoat materials, so-called primer-surfacers, coating compositions which comprise color pigments and/or effect pigments and are known as basecoat materials, and clearcoat materials, are known. Accordingly, for example, the electrocoat serves basically to protect the substrate from corrosion. The so-called primer-surfacer coat serves principally for protection from mechanical stress, for example stone-chipping, and additionally to level out unevenness substrate. The next coat, referred to as the basecoat, is principally responsible for the creation of esthetic properties such as color and/or effects such as flop, while the clearcoat which then follows serves particularly to impart scratch resistance and the gloss of the multicoat paint system.

Multicoat paint systems of this kind, and also methods for producing them, are described in, for example, DE 199 48 004 A1, page 17, line 37, to page 19, line 22, or else in DE 100 43 405 C1, column 3, paragraph [0018], and column 8, paragraph [0052], to column 9, paragraph [0057], in conjunction with column 6, paragraph [0039] to column 8, paragraph [0050].

The known multicoat paint systems are already able to meet r arty of the performance properties required by the automobile industry. In the recent past, progress has also been made in terms of the environmental profile of such paint systems, especially through the increased use of aqueous coating materials, of which aqueous basecoat materials are an example.

A problem which nevertheless occurs again and again in connection with the production of multicoat paint systems lies in the formation of unwanted inclusions of air, of solvents and/or of moisture, which may become apparent in the form of bubbles beneath the surface of the overall paint system, and may burst open in the course of final curing. The holes that are formed in the paint system as a result, also called pinholes and pops, lead to a disadvantageous visual appearance. The amounts of organic solvents and/or water involved, and also the quantity of air introduced as a result of the application procedure, are too great to allow the overall amount to escape from the multicoat paint system in the course of curing, without giving rise to defects.

Another important quality of coating materials an appropriate rheological behavior (application behavior) specifically a pronounced structural viscosity. This structural viscosity exists when the coating material has a viscosity on the one hand, during the application process (generally spray application) with the high shearing that then exists, which is so low that it can be reasonably atomized, and then, on the other hand, following application to the substrate, with the low shearing that then exists, has a viscosity which is high enough that the coating material is sufficiently sag-resistant and does not run from the substrate or form runs.

The environmental profile of multicoat paint systems is also still in need of improvement. A contribution in this respect has, indeed, already been achieved through the replacement of a significant fraction of organic solvents by water in aqueous paints. A significant improvement, nevertheless, would be achievable by an increase in the solids content of such paints. However, especially in aqueous basecoat materials, which, comprise color pigments and/or effect pigments, it is very difficult to increase the solids content while at the same time maintaining acceptable storage stability (settling behavior) and appropriate rheological properties, or pronounced structural viscosity. In the prior art, accordingly, the structural viscosity is often achieved through the use of inorganic phyllosilicates. Although the use of such silicates can result in very good properties of structural viscosity, the coating materials in question are in need of improvement with regard to their solids content.

The properties of coating materials or paints, examples being aqueous basecoat materials, are critically determined by the components they contain—for example, by polymers employed as binders.

The prior art, accordingly, describes a wide variety of specific polymers, their use in coating materials, and also their advantageous effect on various performance properties of paint systems and coating.

DE 197 19 924 A1 describes a process preparing a storage-stable dispersion polyurethanes containing amino groups, the preparation of which involves reaction of polyurethane prepolymers containing isocyanate groups with specific polyamines that have no primary amino groups and involves dispersion in water before or after the reaction. One possible area of application is the provision of coating materials.

DE 31 37 748 A1 describes storage-stable aqueous dispersions of polyurethane-polyureas produced, again, by reaction of a polyurethane prepolymer containing isocyanate groups with a specific polyamine. One possible area of application is the provision of coatings on metallic substrates.

WO 2014/007915 A1 discloses a method for producing a multicoat automobile finish, using an aqueous basecoat material which comprises an aqueous dispersion of a polyurethane-polyurea resin. The use of the basecoat material produces positive effects on the optical properties, in particular a minimizing of gel specks.

WO 2012/160053 A1 describes hydrophilic layer assemblies for medical instruments, with aqueous dispersions of polyurethane-polyurea resins being among the components used in producing the assembly.

Likewise described is the use of microgels, or dispersions of such gels, in various coating materials, in order thereby to optimize different performance properties of coating systems. A microgel dispersion, as is known, is a polymer dispersion in which, on the one hand, the polymer is present in the form of comparatively small particles, having particle sizes of 0.02 to 10 micrometers, for example ("micro"-gel). On the other hand, however, the polymer particles are at least partly intramolecularly crosslinked; the internal structure, therefore, equates to that of a typical polymeric network. Because of the molecular nature, however, these particles are in solution in suitable organic solvents; macroscopic networks, by contrast, would merely swell. The physical properties of such systems with crosslinked particles in this order of magnitude, often also called mesoscopic in the literature, lie between the properties of macroscopic structures and microscopic structures of molecular liquids (see, for example, G. Nimtz, P. Marquardt, D. Stauffer, W. Weiss, Science 1988, 242, 1671). Microgels are described with more precision later on below.

DE 35 13 248 A1 describes a dispersion of polymeric micropolymer particles, the dispersion medium being a liquid hydrocarbon. Preparation involves the reaction of a prepolymer containing isocyanate groups with a polyamine such as diethylenetriamine. An advantage cited is the improvement in the resistance to sagging of coatings which comprise the micropolymer particles.

U.S. Pat. No. 4,408,008 describes stable, colloidal aqueous dispersions of crosslinked urea-urethanes whose preparation involves reacting a prepolymer—which is in dispersion in aqueous solution, which contains isocyanate groups, and which comprises hydrophilic ethylene oxide units—with polyfunctional amine chain extenders. The films produced therefrom possess, for example, good hardness and tensile strength.

EP 1 736 246 A1 describes aqueous basecoat materials for application in the area of automobile finishing comprising a polyurethane-urea resin which is in dispersion ire water and which possesses a crosslinked fraction of 20% to 95%, This aqueous crosslinked resin is prepared in a two-stage process, by preparation of a polyurethane prepolymer containing isocyanate groups, and subsequent reaction of this prepolymer with polyamines. The prepolymer, in a solution in acetone with a solids content of about 80%, is dispersed in water, and then reacted with the polyamine. The use of this crosslinked resin results in advantageous optical properties on the part of multicoat paint systems.

DE 102 38 349 A1 describes polyurethane microgels in water, with one microgel explicitly produced having a crosslinked gel fraction of 60%. The microgels are used in waterborne basecoat materials, where they lead to advantageous rheological properties. Furthermore, through the use of the waterborne basecoat materials in the productions of multicoat paint systems, advantages are achieved in respect of decorative properties and adhesion properties.

As a result of the highly promising performance properties of microgel dispersions, particularly aqueous microgel dispersions, this class of polymer dispersions is seen as particularly highly promising for use in aqueous coating materials.

It should nevertheless be noted that the preparation of such microgel dispersions, or of dispersions of polymers having a crosslinked gel fraction as described above, must be accomplished in such a ways that not only do the stated advantageous properties result, but also, furthermore, no adverse effects arise on other important properties of aqueous coating materials. Thus, for example, it is difficult to provide microgel dispersions with polymer particles that on the one hand have the crosslinked character described, but on the other hand have particle sizes which permit an appropriate storage stability. As is known, dispersions having comparatively larger particles, in the range of, for example, greater than 2 micrometers (average particle size), possess increased sedimentation behavior and hence an impaired storage stability.

Problem

The problem for the present invention, accordingly, was first of all to provide an aqueous polymer dispersion which allows advantageous performance properties to be obtained in aqueous coating materials, or particularly basecoat materials. These properties refer particular to properties which are manifested ultimately in paint systems, especially multicoat paint systems, produced using such an aqueous basecoat material. Qualities to be achieved above all ought to include good optical properties, more particularly a good pinholing behavior and good anti-run stability. The mechanical properties as well, however, such as the adhesion or the stonechip resistance, ought to be outstanding. However, it was likewise necessary to bear in mind here the fact that the aqueous polymer dispersion and basecoat materials produced therefrom possess good storage stability, and that the coating materials formulated with the dispersion can be produced in an environmentally advantageous way, more particularly with a high solids content. In spite of the high solids content, the rheological behavior of the basecoat materials ought to be outstanding.

Technical Solution

It has been found that the problems identified can be solved by means of an aqueous polyurethane-polyurea dispersion (PD) having polyurethane-polyurea particles present in the dispersion, having an average particle size of 40 to 2000 nm, and having a gel fraction of at least 50%, obtainable by (I) preparing a composition (Z) comprising, based in each case on the total amount of the composition (Z), (Z.1) to 65 wt % of at least one intermediate containing isocyanate ups and having blocked primary amino groups, its preparation comprising the reaction (Z.1.1) of at least one polyurethane prepolymer containing isocyanate groups and comprising anionic groups and/or groups which can be converted into anionic groups, with (Z.1.2) at least one polyamine comprising at least two blocked primary amino groups and at least one free Secondary amino group, by addition reaction of isocyanate groups from (Z.1.1) with free secondary amino groups from (Z.1.2), (Z.2) 35 to 85 wt. % to least one organic solvent which possesses a solubility in water of not more than 3 temperature of 20° C., (II) dispersing the composition (Z) in aqueous phase, and
(III) at least partly removing the at least one organic solvent (Z.2) from the dispersion obtained in (II).

The new aqueous dispersion (PD) is also referred to below as aqueous dispersion of the invention. Preferred embodiments of the aqueous dispersion (PD) of the invention are apparent from the description which follows and from the dependent claims.

Likewise provided by the present invention are a process for preparing the aqueous dispersion (PD) of the invention, and also a pigmented aqueous basecoat material comprising the aqueous dispersion (PD).

The present invention also provides a method for producing multicoat paint systems using the pigmented aqueous basecoat material, and also the multicoat paint systems producible by means of said method. The present invention further relates to the use of the pigmented aqueous basecoat material for improving performance properties of multicoat paint systems.

It has emerged that through the use of the dispersion (PD) of the invention in aqueous basecoat materials, it is possible to achieve outstanding performance properties on the part of multicoat paint systems which have been produced using the basecoat materials. Deserving of mention above all are good optical properties, more particularly good pinholing behavior and good anti-run stability. Also outstanding, however, are the mechanical properties such as the adhesion or the stonechip resistance. At the same time the aqueous dispersions (PD) and basecoat materials produced from them exhibit good storage stability. Furthermore, the coating materials formulated with the dispersion can be produced in an environmentally advantageous way, more particularly with a high solids content.

DESCRIPTION

The aqueous dispersion (PD) of the invention is a polyurethane-polyurea dispersion. This means, therefore, that the polymer particles present in the dispersion are polyurethane-polyurea-based. Such polymers are preparable in principle by conventional polyaddition of, for example, polyisocyanates with polyols and also polyamines. With a view to the dispersion (PD) of the invention and to the polymer particles it contains, however, there are specific conditions to be observed, which are elucidated below.

The polyurethane-polyurea particles present in the aqueous polyurethane-polyurea dispersion (PD) possess a gel fraction of at least 50% (for measurement method, see Example section). Moreover, the polyurethane-polyurea particles present in the dispersion (PD) possess an average particle size of 40 to 2000 nanometers (nm) (for measurement method, see Example section).

The dispersions (PD) of the invention, therefore, are microgel dispersions. Indeed, as already described above, a microgel dispersion is a polymer dispersion in which on the one hand the polymer is present in the form of comparatively small particles, or microparticles, and on the other hand the polymer particles are at least partly intramolecularly crosslinked. The latter means that the polymer structures present within a particle equate to a typical macroscopic network, with three-dimensional network structure. Viewed macroscopically, however, a microgel dispersion of this kind continues to be a dispersion of polymer particles in a dispersion medium, water for example. While the particles may also in part have crosslinking bridges to one another (purely from the preparation process, this can hardly be ruled out), the system is nevertheless a dispersion with discrete particles included therein that have a measurable average particle size.

Because the microgels represent structures which lie between branched and macroscopically crosslinked systems, they combine, consequently, the characteristics of macromolecules with network structure that are soluble in suitable organic solvents, and insoluble macroscopic networks, and so the fraction of the crosslinked polymers can be determined, for example, only following isolation of the solid polymer, after removal of water and any organic solvents, and subsequent extraction. The phenomenon utilized here is that whereby the microgel particles, originally soluble in suitable organic solvents, retain their inner network structure after isolation, and behave, in the solid, like a macroscopic network. Crosslinking may be verified the experimentally accessible gel fraction. The gel fraction is ultimately the fraction of polymer from the dispersion that cannot be molecularly dispersely dissolved, as an isolated solid, in a solvent. It is necessary here to rule out a further increase in the gel fraction from crosslinking reactions subsequent to the isolation of the polymeric solid. This insoluble fraction corresponds in turn to the fraction of the polymer that is present in the dispersion in the form of intramolecularly crosslinked particles or particle fractions.

In the context of the present invention it has emerged that only microgel dispersions with polymer particles having particle sizes in the range essential to the invention have all of the required performance properties. Particularly important, therefore, is a combination of fairly low particle sizes and, nevertheless, a significant crosslinked fraction or gel fraction. Only in this way is it possible to achieve the advantageous properties, more particularly the combination of good optical and mechanical properties on the part of multicoat paint systems, on the one hand, and a high solids content and good storage stability of aqueous basecoat materials, on the other.

The polyurethane-polyurea particles present in the aqueous polyurethane-polyurea dispersion (PD) preferably possess a gel fraction of at least 60%, more preferably of at least 70%, especially preferably of at least 80%. The gel fraction may therefore amount to up to 100% or approximately 100%, as for example 99% or 98%. In such a case, then, the entire—or almost the entire—polyurethane-polyurea polymer is present in the form of crosslinked particles.

The polyurethane-polyurea particles present in the dispersion (PD) preferably posse an average particle size of 40 to 1500 nm, more preferably of 100 to 1000 nm, more preferably 110 to 500 nm, and even more preferably 120 to 300 nm. An especially preferred range is from 130 to 250 nm.

The polyurethane-polyurea dispersion (PD) obtained is aqueous. The expression "aqueous" is known in this context to the skilled person. It refers fundamentally to a system which comprises as its dispersion medium not exclusively or primarily organic solvents (also called solvents); instead, it comprises as its dispersion medium a significant water. Preferred embodiments of the aqueous character, defined on the basis of the maximum amount of organic solvents and/or on the basis of the amount of water, are described later on below.

The aqueous dispersion (PD) can be obtained by a specific three-stage process, namely by the process—likewise in accordance with the invention—for preparing an aqueous dispersion (PD).

In a first step (I) specific cc position (Z) is prepared.

The composition (Z) comprises at least one, preferably precisely one, specific intermediate (Z.1) which contains isocyanate groups and has blocked primary amino groups.

The prep ration of the intermediate (Z.1) involves h reaction of at least one polyurethane prepolymer (Z.1.1), containing isocyanate groups and comprising anionic groups and/or groups which can be converted into anionic groups, with at least one polyamine (Z.1.2), comprising at least two blocked primary amino groups and at least one free secondary amino group. The intermediate is therefore preparable by reaction of the components (Z.1.1) and (Z.1.2).

Polyurethane polymers containing isocyanate groups and comprising anionic groups and/or groups which can be converted into anionic groups are known in principle. For the purposes of the present invention, component (Z.1.1) is referred to as prepolymer, for greater ease of comprehension. This component is in feet a polymer which can be referred to as a precursor, since it is used as starting component for preparing other component, specifically the intermediate (Z.1).

For preparing the polyurethane prepolymers (Z.1.1) which contain isocyanate groups and comprise anionic groups and/or groups which can be converted into anionic groups, it is possible to employ the aliphatic, cycloaliphatic, aliphatic-cycloaliphatic, aromatic, aliphatic-aromatic and/or cycloaliphatic-aromatic polyisocyanates that are known to the skilled person. Diisocyanates are used with preference. Mention may be made, by way of example, of the following diisocyanates: 1,3- or 1,4-phenylene diisocyanate, 2,4- or 2,6-tolylene diisocyanate, 4,4'- or 2,4'-diphenylmethane diisocyanate, 1,4- or 1,5-naphthylene diisocyanate, diisocyanatodiphenyl ether, trimethylene diisocyanate, tetramethylene diisocyanate, ethylethylene diisocyanate, 2,3-dimethylethylene diisocyanate, 1-methyltrimethylene diisocyanate, pentamethylene diisocyanate, 1,3-cyclopentylene diisocyanate, hexamethylene diisocyanate, cyclohexylene diisocyanate, 1,2-cyclohexylene diisocyanate octamethylene diisocyanate, trimethylhexane diisocyanate, tetramethylhexane diisocyanate, decamethylene diisocyanate dodecamethylene diisocyanate, tetradecamethylene diisocyanate, isophorone diisocyanate (IPDI), 2-isocyanatopropylcyclohexyl isocyanate, dicyclohexylmethane 2,4'-diisocyanate, dicyclohhexylmethane 4,4'-diisocyanate, 1,4- or 1,3-bis(isocyanatomethyl)cyclohexane, 1,4- or, 3- or 1,2-diisocyanatocyclohexane, 2,4- or 2,6-diisocyanato-1-methylcyclohexane, 1-isocyanatomethyl-5-isocyanato-1,3,3-trimethylcyclohexane, 2,3-bis(8-isocyanatooctyl)-4-octyl-5-hexylcyclohexene, tetramethylxylylene diisocyanates (TMXDI) such as m-tetramethylxylylene diisocyanate, or mixtures of these polyisocyanates. Also possible, of course, is the use of different dimers and trimers of the stated diisocyanates, such as uretdiones and isocyanurates. Polyisocyanates of higher isocyanate functionality may also be used. Examples thereof are tris(4-isocyanatophenyl)methane, 1,3,4-triisocyanatobenzene, 2,4,6-triisocyanatotoluene, 1,3,5-tris(6-isocyanatohexylbiuret), bis(2,5-diisocyanato-4-methylphenyl)methane. The functionality may optionally be lowered by reaction with monoalcohols and/or secondary amines. Preference, however given to using diisocyanates, more particularly to using aliphatic diisocyanates, such as hexamethylene diisocyanate, isophorone diisocyanate (IPDI), dicyclohexylmethane 4,4'-diisocyanate, 2,4- or 2,6-diisocyanato-1-methylcyclohexane, and m-tetramethylxylylene diisocyanate (m-TMXDI). An isocyanate is termed aliphatic when the isocyanate groups are attached to aliphatic groups; in other words, when there is no aromatic carbon present in alpha position to an isocyanate group.

The prepolymers (Z.1.1.1) are prepared by reacting the stated polyisocyanates with polyols, more particularly diols, generally with formation of urethanes.

Examples of suitable polyols are saturated or olefinically unsaturated polyester polyols and/or polyether polyols. Polyols used more particularly are polyester polyols, especially those having a number-average molecular weight of 400 to 5000 g/mol (for measurement method, see Example section). Such polyester polyols, preferably polyester diols, may be prepared in a known way by reaction of corresponding polycarboxylic acids, preferably dicarboxylic acids, and/or their anhydrides with corresponding polyols, preferably diols, by esterification, it is of course optionally possible in addition, even proportionally, to use monocarboxylic acids and/or alcohols for the preparation. The polyester diols are preferably saturated, more particularly saturated and linear.

Examples of suitable aromatic polycarboxylic acids f preparing such polyester polyols, preferably polyester diols, are phthalic acid, isophthalic acid, and terephthalic acid, of which isophthalic acid is advantageous and is therefore used with preference. Examples of suitable aliphatic polycarboxylic acids are oxalic acid, malonic acid, succinic acid, glutaric acid, adipic acid, pimelic acid, suberic acid, azelaic acid, sebacic acid, undecanedicarboxylic acid, and dodecanedicarboxylic acid, or else hexahydrophthalic acid, 1,3-cyclohexanedicarboxylic acid, 1,4-cyclohexanedicarboxylic acid, 4-methylhexahydrophthalic acid, tricyclodecanedicarboxylic acid, and tetrahydrophthalic acid. As dicarboxylic acids it is likewise possible to use dimer fatty acids or dimerized fatty acids, which, as is known, are mixtures prepared by dimerizing unsaturated fatty acids and are available, for example, under the commercial names Radiacid (from Oleon) or Pripol (from Croda). In the present context, the use of such dimer fatty acids for preparing polyester diols is preferred. Polyols used with preference for preparing the prepolymers (Z.1.1) are therefore polyester diols which have been prepared using dimer fatty adds. Especially preferred are polyester diols in whose preparation at least 50 wt %, preferably 55 to 75 wt %, of the dicarboxylic acids employed are dimer fatty acids.

Examples of corresponding polyols for preparing polyester polyols, preferably polyester diols, are ethylene glycol, 1,2- or 1,3-propanediol, 1,2-, 1,3-, or 1,4-butanediol, 1,2-, 1,3-, 1,4-, or 1,5-pentanediol, 1,2-, 1,3-, 1,4-, or 1,6-hexanediol, neopentyl hydroxypivalate pentyl glycol, diethylene glycol, 1,2-, 1,3-, or 1,4-cyclohexanediol, 1,2-, 1,3-, or 1,4-cyclohexanedimethanol, and trimethylpentanediol. Diols are therefore used with preference. Such polyols and/or diols may of course also be used directly for preparing the prepolymer (Z.1.1), in other words reacted directly with polyisocyanates.

Further possibilities for use in preparing the prepolymers (Z.1.1) are polyamines such as diamines and/or amino alcohols. Examples of diamines include hydrazine, alkyl- or cycloalkyldiamines such as propylene diamine and 1-amino-3-aminomethyl-3,5,5-trimethylcyclohexane, and examples of amino alcohols include ethanolamine or diethanolamine.

The prepolymers (Z.1.1) comprise anionic groups and/or groups which can be converted into anionic groups (that is, groups which can be converted into anionic groups by the use of known neutralizing agents, and also neutralizing agents specified later on below, such as bases). As the skilled person is aware, these groups are, for example, carboxylic, sulfonic and/or phosphonic acid groups, especially preferably carboxylic acid groups (functional groups which can be converted into anionic groups by neutralizing agents), and also anionic groups derived from the aforementioned functional groups, such as, more particularly, carboxylate, sulfonate and/or phosphonate groups, preferably carboxylate groups. The introduction of such groups is known to increase the dispersibility in water. Depending on the conditions selected, the stated groups may be present proportionally or almost completely in the one form (carboxylic acid, for example) or the other form (carboxylate). One particular influencing factor resides, for example, in the use of the neutralizing agents which have already been addressed and which are described in even more detail later on below. If the prepolymer (Z1.1) is mixed with such neutralizing agents, then an amount of the carboxylic add groups is converted into carboxylate groups, this amount corresponding to the amount of the neutralizing agent. Irrespective of the form in which the stated groups are present, however, a uniform nomenclature is frequently selected in the context of the present invention, for greater ease of comprehension. Where, for example, a particular acid number is specified for a polymer, such as for a prepolymer (Z.1.1), or where such a polymer is referred to as carboxy-functional, this reference hereby always embraces not only the carboxylic acid groups but also the carboxylate groups. If there is to be any differentiation in this respect, such differentiation is dealt with, for example, using the degree of neutralization.

In order to introduce the stated groups, it is possible, during the preparation of the prepolymers (Z.1.1), to use starting compounds which as well as groups for reaction in the preparation of urethane bonds, preferably hydroxyl groups, further comprise the abovementioned groups, carboxylic acid groups for example. In this way the groups in question are introduced into the prepolymer.

Corresponding compounds contemplated for introducing the preferred carboxylic acid groups are polyether polyols and/or polyester polyols, provided they contain carboxyl groups. However, compounds used with preference are at any rate low molecular weight compounds which have at least one carboxylic acid group and at least one functional group reactive toward isocyanate groups, preferably hydroxyl groups. In the context of the present invention, the expression "low molecular weight compound", as opposed to higher molecular weight, compounds, especially polymers, should be understood to mean those to which a discrete molecular weight can be assigned, as preferably monomeric compounds. A low molecular weight compound is thus, more particularly, not a polymer, since the latter are always a mixture of molecules and have to be described using mean molecular weights. Preferably, the term "low molecular weight compound" is understood to mean that the corresponding compounds have a molecular weight of less than 300 g/mol. Preference is given to the range from 100 to 200 g/mol.

Compounds preferred in this context are, for example, monocarboxylic acids containing two hydroxyl groups, as for example dihydroxypropionic acid, dihydroxysuccinic acid, dihydroxybenzoic acid. Very particular compounds are alpha,alpha-dimethylolalkanoic acids such as 2,2-dimethylolacetic acid, 2,2-dimethylolpropionic acid, 2,2-dimethylolbutyric acid and 2,2-dimethylolpentanoic acid, especially 2,2-dimethylolpropionic acid.

Preferably, therefore, the prepolymers (Z.1.1) are carboxy-functional. They preferably possess an acid number, based on the solids content, of 10 to 35 mg KOH/g, more particularly 15 mg KOH/g (for measurement method, see Example section).

The number-average molecular weight of the prepolymers may vary widely and is situated for example in the range from 2000 to 20 000 g/mol, preferably from 3500 to 6000 g/mol (for measurement method, see Example section).

The prepolymer (Z.1.1) contains isocyanate groups. Preferably, based inn the solids content, it possesses an isocyanate content of 0.5 to 6.0 wt %, preferably 1.0 to 5.0 wt. % especially preferably 1.5 to 4.0 wt % (for measurement method, see Example section).

Given that the prepolymer (Z.1.1) contains isocyanate groups, the hydroxyl number of the prepolymer is likely in general to be very low. The hydroxyl number of the prepolymer, based on the solids content, is preferably less than 15 mg KOH/g, more particularly less than 10 mg KOH/g, even more preferably less than 5 mg KOH/g (for measurement method, see Example section).

The prepolymers (Z.1.1) may be prepared by known and established methods in bulk or solution, especially preferably by reaction of the starting compounds in organic solvents, such as preferably methyl ethyl ketone, at temperatures of, for example, 60 to 120° C., and optionally with use of catalysts typical for polyurethane preparation. Such catalysts are known to those skilled in the art, one example being dibutyltin laurate. The procedure here is of course to select the proportion of the starting components such that the product, in other words the prepolymer (Z.1.1), contains isocyanate groups. It is likewise directly apparent that the solvents ought to be selected in such a way that they do not enter into any unwanted reactions with the functional groups of the starting compounds, in other words being inert toward these groups to the effect that they do not hinder the reaction of these functional groups. The preparation is, preferably actually carried out in an organic solvent (Z.2) as described later on below, since this solvent must in any case be present in the composition (Z) for preparation in stage (I) of the process of the invention.

As already indicated above, the groups in the prepolymer (Z.1.1) which can be converted into anionic groups may also be present proportionally as correspondingly; anionic groups, as a result of the use of a neutralizing agent, for example. In this way it is possible to adjust the water-dispersibility of the prepolymers (Z.1.1) and hence also of the intermediate (Z.1).

Neutralizing agents contemplated include, in particular, the known basic neutralizing agents such as, for example, carbonates, hydrogencarbonates, or hydroxides of alkali metals and alkaline earth metals, such as LiOH, NaOH, KOH, or Ca(OH)$_2$ for example. Likewise suitable for the neutralization and preferred for use in the context of the present invention are organic bases containing nitrogen, such as amines, such as ammonia, trimethylamine, triethylamine, tributylamines, dimethylaniline, triphenylamine, dimethylethanolamine, methyldiethanolamine, or triethanolamine, and also mixtures thereof.

The neutralization of the prepolymer (Z.1.1) with the neutralizing agents, more particularly with the nitrogen-containing organic bases, may take place after the preparation of the prepolymer in organic phase, in other words in solution with an organic, solvent, more particularly a solvent (Z.2) as described below. The neutralizing agent may of course also be added during or before the beginning of the actual polymerization, in which case, for example, the starting compounds containing carboxylic acid groups are neutralized.

If neutralization of the groups which can be converted into anionic groups, more particularly of the carboxylic acid groups, is desired, the neutralizing agent may be added, for example, in an mount such that a proportion of 5 to 65% of the groups is neutralized (degree of neutralization). Preference is given to a range from 40% to 60% (for method of calculation, see Example section).

The prepolymer (Z1.1) is preferably neutralized as described after its preparation and before its use or preparing the intermediate (Z.1).

The preparation of the intermediate (Z.1) involves the reaction of the above-described prepolymer (Z.1.1) with at least one, preferably precisely one, specific polyamine (Z.1.2).

The polyamine (Z.1,2) comp free secondary amino group.

Blocked amino groups, as is known, are those n which the hydrogen residues on the nitrogen that are present inherently in free amino groups have been substituted by reversible reaction with a blocking agent. In view of the blocking, the amino groups cannot be reacted like free amino groups, via condensation reactions or addition reactions, and in this respect are therefore nonreactive, thereby differentiating them from free amino groups. The reactions known per se for the amino groups are then evidently only enabled after the reversibly adducted blocking agent has been removed again, thereby producing in turn the free amino groups. The principle therefore resembles the principle of capped or blocked isocyanates, which are likewise known within the field of polymer chemistry.

The primary amino groups of the polyamine (Z.1.2) may be blocked with the blocking agents that are known per se, as for example with ketones and/or aldehydes. Such blocking in that case, with release of water, produces ketimines and/or aldimines which no longer contain any, nitrogen-hydrogen bonds, meaning that typical condensation reactions or addition reactions of an amino group with a further functional group, such as an isocyanate group, are unable to take place.

Reaction conditions for the preparation of a blocked primary amine of this kind, such as of a ketimine, for example, are known. Thus, for example, such blocking may be realized introduction of heat to a mixture of a primary amine with an excess of a ketone which functions at the same time as a solvent for the amine. The water of reaction formed is preferably removed during the reaction, in order to prevent the possibility otherwise of reverse reaction (deblocking) of the reversible blocking.

The reaction conditions for deblocking of blocked primary amino groups are also known per se. For example, simply the transfer of a blocked amine to the aqueous phase the equilibrium back to the side of the deblocking, as a result of the concentration pressure then exists, exerted by the water, and thereby to generate free primary amino groups and also a free ketone, with consumption of water.

It follows from the above that in the context of the present invention, a clear distinction is being made between blocked and free amino groups. If, nevertheless, an amino group individually is specified neither as being blocked nor as being free, the reference there is to a free amino group.

Preferred blocking agents for blocking tale primary amino groups of the polyamine (Z.1.2) are ketones. Particularly preferred among the ketones are those which constitute an organic solvent (Z.2) as described later on below. The reason is that these solvents (Z.2) must be present in any case in the composition (Z) for preparation in stage (I) of the process of the invention. It has already been indicated above that the preparation of corresponding primary amines blocked with a ketone proceeds to particularly good effect in an excess of the ketone. Through the use of ketones (Z.2) for the blocking, therefore, it is possible to use the correspondingly preferred preparation procedure for blocked amines, without any need for costly and inconvenient removal of the blocking agent, which may be unwanted. Instead, the solution of the blocked amine can be used directly in order to prepare the intermediate (Z.1). Preferred) blocking agents are acetone, methyl ethyl ketone, methyl isobutyl ketone, diisopropyl ketone, cyclopentanone, or cyclohexanone particularly preferred agents are the ketones (Z.2) methyl ethyl ketone and methyl isobutyl ketone.

The preferred blocking with ketones and/or aldehydes, more particularly ketones, and the accompanying preparation of ketimines and/or aldimines, has the advantage, moreover, that primary amino groups are blocked selectively. Secondary amino groups present are evidently unable to be blocked, and therefore remain free. Consequently a polyamine (Z.1.2) which as well as the at least two blocked primary amino groups also contains at least one free secondary amino group can be prepared readily by way of the stated preferred blocking reactions from a polyamine which contains exclusively free secondary and primary amino groups.

The polyamines (Z.1.2) may be prepared by blocking the primary amino groups of conventional polyamines containing at least two primary amino groups and at least one secondary amino group. Ultimately suitable are all aliphatic, aromatic, or aralipathic (mixed aliphatic-aromatic) polyamines which are known per se and which have at least two primary amino groups and at least one secondary amino group. This means that as well as the stated amino groups, there may per se be any aliphatic, aromatic, or aralipathic groups present. Possible, for example, are monovalent groups located as terminal groups on a secondary amino group, or divalent groups located between two amino groups.

Aliphatic in the context of the present invention is an epithet referring to all organic groups which are not aromatic. For example, the groups present as well as the stated amino groups may be aliphatic hydrocarbon groups, in other words groups which consist exclusively of carbon and hydrogen and which are not aromatic. These aliphatic hydrocarbon groups may be linear, branched, or cyclic, and may be saturated or unsaturated. These groups may of course also include both cyclic and linear or branched moieties. It is also possible for aliphatic groups to contain heteroatoms, more particularly in the form of bridging groups such as ether, ester, amide and/or urethane groups. Possible aromatic groups are likewise known and require no further elucidation.

The polyamines (Z.1.2) preferably consist at least two blocked primary amino groups, at least one free secondary amino group, and also aliphatically saturated hydrocarbon groups.

Likewise preferably, the polyamines (Z.1.2) possess two blocked primary amino groups and one or two secondary amino groups, and as, primary amino groups they possess exclusively blocked primary amino groups, and as secondary amino groups they possess exclusively free secondary amino groups.

Preferably, in total, the polyamines possess three or four amino groups, these groups being selected from the group consisting of the blocked primary amino groups and of the free secondary amino groups.

Especially preferred polyamines (Z.1.2) are therefore those which consist blocked primary amino groups, one or two free secondary amino groups, and also aliphatically saturated hydrocarbon groups.

Examples of preferred polyamines from which polyamines (Z.1.2) may be prepared by blocking of the primary amino groups are diethylenetriamine, 3-(2-aminoethyl)aminopropylamine, dipropylenetriamine, and also N1-(2-(4-(2-aminoethyl)piperazin-1-yl)ethyl)ethane-1,2-diamine (one secondary amino group, two primary amino groups for blocking) and triethylenetetramine, and also N,N'-bis(3-aminopropyl)ethylenediamine (two secondary amino groups, two primary amino groups for blocking).

To the skilled person it is clear that, not least for reasons associated with pure technical synthesis, there cannot always be a theoretically idealized quantitative conversion in the blocking of primary amino groups. For example, if a particular amount of a polyamine is blocked, the proportion of the primary amino groups that are blocked in the blocking process may be, for example, 95 mol % or more (determinable by IR spectroscopy: see Example section). Where a polyamine in the nonblocked state, for example, possesses two free primary amino groups, and where the primary amino groups of a certain quantity of this amine are then blocked, it is said in the context of the present invention that this amine has two blocked primary amino groups if a fraction of more than 95 mol % of the primary amino groups present in the quantity employed are blocked. This is due on the one hand to the fact, already stated, that from a technical synthesis standpoint, a quantitative conversion cannot always be realized. On the other hand, the fact that more than 95 mol % of the primary amino groups are blocked means that the major fraction of the total amount of the amines used for blocking does in fact contain exclusively blocked primary amino groups, specifically exactly two blocked primary amino groups.

The preparation of the intermediate (Z.1) involves the reaction of the prepolymer (Z.1.1) with the polyamine (Z.2.1.2) by addition reaction of isocyanate groups from (Z.2.1.1) with free secondary amino groups from (2.1.2). This reaction, which is known per se, then leads to the attachment of the polyamine (Z.1.2) onto the prepolymer (Z.1.1), with formation of urea bonds, ultimately forming the intermediate (Z.1). It will be readily apparent that in the preparation of the intermediate (Z.1), preference is given to not using any other amines having free or blocked secondary or free or blocked primary amino groups.

The intermediate (Z.1) can be prepared by known and established techniques in bulk or solution, especially preferably by reaction of (Z.1.1) with (Z.1.2) in organic solvents. It is immediately apparent that the solvents ought to be selected in such a way that they do not enter into any unwanted reactions with the functional groups of the starting compounds, and are therefore inert or largely inert in their behavior toward these groups. As solvent in the preparation, preference is given to using, at least proportionally, an organic solvent (Z.2) as described later on below, especially methyl ethyl ketone, even at this stage, since this solvent must in any case be present in the composition (Z) to be prepared in stage (I) of the process of the invention. With preference a solution of a prepolymer (Z.1.1) in a solvent (Z.2) is mixed with a solution of a polyamine (Z.1.2) in a solvent (Z.2), and the reaction described can take place.

Of course, the intermediate (Z.1) thus prepared may be neutralized during or after the preparation, using neutralizing agents already described above, in the manner likewise described above for the prepolymer (Z.1.1). It is nevertheless preferred for the prepolymer (Z.1.1) to be neutralized prior to its use for preparing the intermediate (Z.1), in a manner described above, so that neutralization during or after the preparation of (Z.1) is no longer relevant. In such a case, therefore, the degree of neutralization of the prepolymer (Z.1.1) can be equated with the degree of neutralization of the intermediate (Z.1). Where there is no further addition of neutralizing agents at all in the context of the process of the invention, therefore, the degree of neutralization of the polymers present in the ultimately prepared dispersions (PD) of the invention can also be equated with the degree of neutralization of the prepolymer (Z.1.1).

The intermediate (Z.1) possesses blocked primer amino groups. This can evidently be achieved in that the free secondary amino groups are brought to reaction in the reaction of the prepolymer (Z.1.1) and of the polyamine (Z.1.2), but the blocked primary amino groups are not reacted. Indeed, as already described above, the effect of the blocking is that typical condensation reactions or addition reactions with other functional groups, such as isocyanate groups, are unable to take place. This of course means that the conditions for the reaction should be selected such that the blocked amino groups also remain blocked, in order thereby to provide an intermediate (Z.1). The skilled person knows how to set such conditions, which are brought about, for example, by reaction in organic solvents, which is preferred in any case.

The intermediate (Z.1) contains isocyanate groups. Accordingly, in the reaction of (Z.1.1) and (Z.1.2), the ratio of these components must of course be selected such that the product that is, the intermediate (Z.1)—contains isocyanate groups.

Since, as described above, in the reaction of (Z.1.1) with (Z.1.2), free secondary amino groups are reacted with isocyanate groups, but the primary amino groups are not reacted, owing to the blocking, it is first of all immediately clear that in this reaction the molar ratio of isocyanate groups from (Z.1.1) to free secondary amino groups from (Z.1,2) must be greater than 1. This feature arises implicitly, nevertheless clearly and directly from the feature essential to the invention namely that the intermediate (Z.1) contains isocyanate groups.

It is nevertheless preferred for there to be an excess of isocyanate groups, defined as below, during the reaction. The molar amounts (n) of isocyanate groups, free secondary amino groups, and blocked primary amino groups, in this preferred embodiment, satisfy the following condition: [n (isocyanate groups from (Z.1.1))–n (free secondary amino groups from (Z.1.2))]/n (blocked primary amino groups from (Z.1.2))=1.2/1 to 4/1, preferably 1.5/1 to 3/1 very preferably 1.8/1 to 2.2/1, even more preferably 2/1.

In this preferred embodiment, the intermediate (Z.1), formed by reaction of isocyanate groups from (Z.1.1) with the free secondary amino groups from (Z.1.2), possesses an excess of isocyanate groups in relation to the blocked primary amino groups. This excess is ultimately achieved by selecting the molar ratio of isocyanate groups from (Z.1.1) to the total amount of free secondary amino groups and blocked primary amino groups from (Z.1.2) to be large enough that even after the preparation of) and the corresponding consumption of isocyanate groups by the reaction with the free secondary amino groups, there remains a corresponding excess of the isocyanate groups.

Where, for example, the polyamine (Z.1.2) has one free secondary amino group and two blocked primary amino groups, the molar ratio between the isocyanate groups from (Z.1.1) to the polyamine (Z.1.2) in the especially preferred embodiment is set at 5/1. The consumption of one isocyanate group in the reaction with the free second amino group would then mean that 4/2 (or 2/1) was realized for the condition stated above.

The fraction of the intermediate (Z.1) is, from 15 to 65 wt %, preferably from 25 to 60 wt %, more preferably from 30 to 55 wt %, especially preferably from 35 to 52.5 wt %, and, in one very particular embodiment from 40 to 50 wt %, based in each case on the total amount of the composition (Z).

Determining the fraction of an intermediate (Z.1) may be carried out as follows: The solids content of a mixture which besides the intermediate (Z.1) contains only organic solvents is ascertained (for measurement method for determining the solids (also called solids content, see Example section). The solids content then corresponds to the amount of the intermediate (Z.1). By taking account of the solids content of the mixture, therefore, it is possible to determine or specify the fraction of the intermediate (Z.1) in the composition (Z). Given that the intermediate (Z.1) is preferably prepared in an organic solvent anyway, and therefore, after the preparation, is in any case present in a mixture which comprises only organic solvents apart from the intermediate, this is the technique of choice.

The composition (Z) further comprises at least on specific organic solvent (Z.2).

The solvents (Z.2) possess a solubility in water of not more than 38 wt % at a temperature of 20° C. (for measurement method, see Example section). The solubility in water at a temperature of 20° C. is preferably less than 30 wt %. A preferred range is from 1 to 30 wt %.

The solvent (Z.2) accordingly possesses a fairly moderate solubility in water, being in particular not fully miscible with water or possessing no infinite solubility in water. A solvent is fully miscible with water when it can be mixed in any proportions with water without occurrence of separation, in other words of the formation of two phases.

Examples of solvents (Z.2) are methyl ethyl ketone, methyl isobutyl ketone, diisobutyl ketone, diethyl ether, dibutyl ether, dipropylene glycol dimethyl ether, ethylene glycol diethyl ether, toluene, methyl acetate, ethyl acetate, butyl acetate, propylene carbonate, cyclohexanone, or mixtures of these solvents. Preference is given to methyl ethyl ketone, which has a solubility in water of 24 wt % at 20° C.

No solvents (Z.2) are therefore solvents such as acetone, N-methyl-2-pyrrolidone, N-ethyl-2-pyrrolidone, tetrahydrofuran, dioxane, N-formylmorpholine, dimethylformamide, or dimethyl sulfoxide.

A particular effect of selecting the specific solvents (Z.2) of only limited solubility in water is that when the composition (Z) is dispersed in aqueous phase, in step (II) of the process of the invention, a homogeneous solution cannot be directly formed. It is assumed that the dispersion that is present instead makes it possible for the crosslinking reactions that occur as part of step (II) (addition reactions of free primary amino groups and isocyanate groups to form urea bonds) to take place in a restricted volume thereby ultimately allowing the formation of the microparticles defined as above.

As well as having the water-solubility described, preferred solvents (Z.2) possess a boiling point of not more than 120° C., more preferably of not more than 90° C. (under atmospheric pressure, in other words 1,013 bar). This has advantages, in the context of step (III) of the process of the invention, said step being described later on below, in other words the at least partial removal of the at least one organic solvent (Z.2) from the dispersion prepared in step (II) of the process of the invention. The reason is evidently that, when using the solvents (Z.2) that are preferred in this context, these solvents can be removed by distillation, for example, without the removal simultaneously of significant quantities of the water introduced in step (II) of the process of the invention. There is therefore no need, for example, for the laborious re-addition of order to retain the aqueous nature of the dispersion (PD).

The fraction of the at least one organic solvent (Z.2) is from 35 to 55 wt %, preferably from 40 to 75 wt % more preferably from 45 to 70 wt %, especially preferably from 47.5 to 65 wt %, and, in one very particular embodiment, from 50 to 60 wt %, based in each case on the total amount of the composition (Z).

In the context of the present invention it has emerged that through the specific combination of a fraction as specified above for the intermediate (Z.1) in the composition (Z), and through the selection of the specific solvents (Z.2) it is possible after the below-described steps (II) and (III), to provide polyurethane-polyurea dispersions which comprise polyurethane-polyurea particles having the requisite particle size, which further have the requisite gel fraction.

The components (Z.1) and (Z.2) described preferably make up in tonal at least 90 wt % of the composition (Z). Preferably the two components make up at least 95 wt %, more particularly at least 97.5 wt %, of the composition (Z). With very particular preference, the composition (Z) consists of these two components. In this context it should be noted that where neutralizing agents as described above are used, these neutralizing agents are ascribed to the intermediate when calculating the amount of an intermediate (Z.1). The reason is that in this case the intermediate (Z.1) at any rate possesses anionic groups which originate from the use of the neutralizing agent. Accordingly, the cation that is present after these anionic groups have formed is likewise ascribed to the intermediate.

Where the composition (Z) includes other components, in addition to components (Z.1) and (Z.2), these other components are preferably just organic solvents. The solids content of the composition (Z) therefore corresponds preferably to the fraction of the intermediate (Z.1) in the composition (Z). The composition (Z) therefore possesses preferably a solids content of 15 to 65 wt %, preferably of 25 to 60 wt %, more preferably of 30 to 55 wt %, especially preferably of 35 to 52.5 wt %, and, in one especially preferred embodiment, of 40 to 50 wt %.

A particularly preferred composition (Z) therefore contains in total at least 90 wt % of components (Z.1) and (Z.2), and other than the intermediate (Z.1) includes exclusively organic solvents.

An advantage of the composition (Z) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Preferably, accordingly, the composition (Z) contains less than 10 wt %, preferably less than 5 wt %, more preferably less than 2.5 wt % of organic solvents selected from the group consisting of N-methyl-2-pyrrolidone, dimethylformamide, dioxane, tetrahydrofuran, and N-ethyl-2-pyrrolidone. The composition (Z) is preferably entirely free from these organic solvents.

In a second step (II) of the process invention, the composition (Z) is dispersed in aqueous phase.

It is known, and also follows from what has already been said above, that in step (II), therefore, there is a deblocking of the blocked primary amino groups of the intermediate (Z.1). Indeed, as a result of the transfer of a blocked amine to the aqueous phase, the reversibly attached blocking agent is released with consumption of water, and free primary amino groups are formed.

It is likewise clear, therefore, that the resulting free primary amino groups are then reacted with isocyanate groups likewise present in the intermediate (Z.1), or in the deblocked intermediate formed from the intermediate (Z.1), by addition reaction, with formation of urea bonds.

It is also known that the transfer to the aqueous phase means that it is possible in principle for the isocyanate groups in the intermediate (Z.1), or in the deblocked intermediate formed from the intermediate (Z.1), to react with the water, with elimination of carbon dioxide, to form free primary amino groups, which can then be reacted in turn with isocyanate groups still present.

Of course, the reactions and conversions referred to above proceed in parallel with one another. Ultimately, as a result, for example, of intermolecular and intramolecular reaction or crosslinking, a dispersion is formed which comprises polyurethane-polyurea particles with defined average particle size and with defined degree of crosslinking or gel fraction.

In step (II) of the process of the invention, then, the composition (Z) is dispersed in water, there being a deblocking of the blocked primary amino groups of the intermediate (Z.1) and a reaction of the resulting free primary amino groups with the isocyanate groups of the intermediate (Z.1) and also with the isocyanate groups of the deblocked intermediate formed from the intermediate (Z.1), by addition reaction.

Step (II) of the process of the invention, in other words the dispersing in aqueous phase, may take place in any desired way. This means that ultimately the only important thing is that the composition (Z) is mixed with water or with an aqueous phase. With preference, the composition (Z), which after the preparation may be for example at room temperature, in other words 20 to 25° C., or at a temperature increased relative to room temperature, of 30 to 60° C., for example, can be stirred into water, producing a dispersion. The water already introduced has room temperature, for example. Dispersion may take, place in pure water (deionized water), meaning that the aqueous phase consists solely of water, this being preferred. Besides water, of course, the aqueous phase, may also include, proportionally, typical auxiliaries such as typical emulsifiers and protective colloids. A compilation of suitable emulsifiers and protective colloids is found in, for example, Houben Weyl, Methoden der organischen Chemie [Methods of Organic Chemistry], volume XIV/1 Makromolekulare Stoffe [Macromolecular compounds], Georg Thieme Verlag, Stuttgart 1981, p. 411 ff.

It is of advantage if in stage (II) of the process of the invention, in other words at the dispersing of the composition (Z) in aqueous phase, the weight ratio of organic solvents and water is selected such that the resulting dispersion has a weight ratio of water to organic solvents of greater than 1, preferably of 1.05 to 2/1, especially preferably of 1.1 to 1.5/1.

In step (III) of the process of the invention, the at least one organic solvent (Z.2) is removed at least partly from the dispersion obtained in step (II). Of course, step (III) of the process may also entail removal of other solvents as well, possibly present, for example, in the composition (Z).

The removal of the at least one organic solvent (Z.2) and of any further organic solvents may be accomplished in any way which is known, as for example by vacuum distillation at temperatures slightly raised relative to room temperature, of 30 to 60° C., for example.

The resulting polyurethane-polyurea dispersion (PD) is aqueous (regarding the basic definition of "aqueous", see earlier on above).

A particular advantage of the dispersion (PD) of the invention is that it can be formulated with only very small fractions of organic solvents, yet enables the advantages described at the outset in accordance with the invention. The dispersion (PD) of the invention contains preferably less than 10 wt %, especially preferably less than 5 wt %, very preferably less than 2.5 wt % of organic, solvents (for measurement method, see Example section).

The fraction of the polyurethane-polyurea polymer in the dispersion (PD) is preferably 25 to 55 wt %, preferably 30 to 50 wt %, more preferably 35 to 45 wt %, based in each case on the total amount of the dispersion (determined as for the determination described above for the intermediate (Z.1) via the solids content).

The fraction of water in the dispersion (PD) is the preferably 45 to 75 wt %, preferably 50 to 70 wt %, more preferably 55 to 65 wt %, based in each case on the total amount of the dispersion.

The dispersion (PD) of the invention consists preferably to an extent of at least 90 wt %, preferably at least 95 wt %, very preferably at least 97.5 wt % of the polyurethane-polyurea polymer and water.

Even more preferred is for the dispersion, other than the polymer, to include only water and any organic solvents, in the form, for example, of residual fractions, not fully removed in stage (III) of the process of the invention. The solids content of the dispersion (PD) is therefore preferably 25% to 55%, preferably 30% to 50%, more preferably 35% to 45%, and more preferably still is in agreement with the fraction of the polymer in the dispersion.

An advantage of the dispersion (PD) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly the dispersion (PD) contains preferably less than 10 wt %, preferably less than 5 wt %, more preferably less than 2.5 wt % of organic solvents selected from the group consisting of N-Methyl-2-pyrrolidone, dimethylformamide, dioxane, tetrahydrofuran, and N-ethyl-2-pyrrolidone. The dispersion (PD) is preferably entirely free from these organic solvents.

Based on the solids content, the polyurethane-polyurea polymer present in the dispersion preferably possesses an acid number of 10 to 35 mg KOH/g, more particularly of 15 to 23 mg KOH/g (for measurement method, see Example, section).

The polyurethane-polyurea polymer present in the dispersion preferably possesses hardly any hydroxyl groups, or none. The OH number of the polymer, based on the solids content, is preferably less than 15 mg KOH/g, more particularly less than 10 mg KOH/g, more preferably still less than 5 mg KOH/g (for measurement method, see Example section).

A further subject of the present invention is a pigmented aqueous basecoat material (waterborne basecoat material) comprising at least one, preferably precisely one, aqueous dispersion (PD). All of, the preferred embodiments stated above with regard to the dispersion (PD) also, of course, apply in respect of the basecoat material comprising a dispersion (PD).

A basecoat material is a color-imparting intermediate coating material that is used in automotive finishing and general industrial painting. This basecoat material is generally applied to a substrate which has been pretreated with a baked (fully cured) primer-surfacer Substrates used may also, include existing paint systems, which may optionally require pretreatment as well (by abrading, for example) To protect a basecoat film from environmental effects in particular, at least one additional clearcoat film is generally applied over it. This is generally done in a wet-on-wet process—that is, the clearcoat material is applied without the basecoat film being cured. Curing then takes place, finally, together with the clearcoat.

The fraction of the dispersions (PD) of the invention, based on the total weight of the pigmented aqueous basecoat material, is preferably 2.5 to 60 wt %, more preferably 10 to 50 wt %, and very preferably 15 to 40 wt % or even 10 to 30 wt %.

The fraction of the polyurethane-polyurea polymers originating from the dispersions of the invention, based on the total weight of the pigmented aqueous basecoat material, is preferably 1 to 30 wt %, more preferably 4 to 25 wt %, and very preferably 6 to 20 wt % or even 8 to 15 wt %.

Determining or, specifying the fraction of the polyurethane-polyurea polymers originating from the dispersions of the invention in the basecoat material may be done via the determination of the solids content of a dispersion (PD) of the invention which is to be used in the basecoat material.

In the case of a possible particularization to basecoat materials comprising preferred dispersions (PD) in a specific proportional range, the following applies. The dispersions (PD) which do not fall within the preferred group may of course still be present in the basecoat material. In that case the specific proportional range applies only to the preferred group of dispersions (PD). It is preferred nonetheless for the total proportion of dispersions (PD), consisting of dispersions from the preferred group and dispersions which are not part of the preferred group, to be subject likewise to the specific proportional range.

In the case of restriction to a proportional range of 4 to 25 wt % and to a preferred group of dispersions (PD), therefore, this proportional range evidently applies initially only to the preferred group of dispersions (PD). In that case, however, it would be preferable for there to be likewise from 4 to 25 wt % in total present of all originally encompassed dispersions, consisting of dispersions from the preferred group and dispersions which do not form part of the preferred group. If, therefore, 15 wt % of dispersions (PD) of the preferred group are used, not more than 10 wt % of the dispersions of the non-preferred group may be used.

The stated principle is valid, for the purposes of the present invention, for all stated components of the basecoat material and for their proportional ranges—for example, for the pigments specified later on below, or else for the crosslinking agents specified later on below, such as melamine resins.

The aqueous basecoat material of the invention is pigmented, thus comprising at least one pigment. Such color pigments and effect pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable, just like the terms "visual effect pigment" and "effect pigment".

Useful effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as platelet-shaped graphite, platelet-shaped iron oxide, multilayer effect pigments composed of PVD films and/or liquid crystal polymer pigments. Particularly preferred for use at any rate, although not necessarily exclusively, are platelet-shaped metal effect pigments, more particularly plated-shaped aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and, manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The fraction of the pigments may b situated for example in the range from 1 to 30 wt %, preferably 1.5 to 20 wt % more preferably 2.0 to 15 wt %, based on the total weight of the pigmented aqueous basecoat material.

Through the use of the dispersion (PD) and of the polymer present therein, the basecoat material of the invention comprises curable binders A "binder" in the context of the present invention and in accordance with relevant DIN EN ISO 4618 is the nonvolatile component of a coating composition, without pigments and fillers. Specific binders, accordingly, also include, for example, typical coatings additives, the polymer present in the dispersion (PD), or further polymers which can be used, as described below, and typical crosslinking agents as described below. Hereinafter, however, the expression, for the sake simply of better clarity, is used principally in relation to particular physically curable, polymers which optionally may also be thermally curable, examples being the polymers in the dispersions (PD), or else different polyurethanes, polyesters, polyacrylates and/or copolymers of the stated polymers.

In the context of the present invention, the term "physical curing" means the formation of a film through loss of solvents from polymer solutions or polymer dispersions. Typically, no crosslinking agents are necessary for this curing.

In the context of the present invention, the term "thermal curing" denotes the heat-initiated crosslinking of a coating film, with either self-crosslinking binders or else a separate crosslinking agent, in combination with a polymer as binder, (external crosslinking), being used in the parent coating material. The crosslinking agent comprises reactive functional groups which are complementary to the reactive functional groups present in the binders. As a result of the reaction of the groups, there is then crosslinking and hence, ultimately, the formation of a macroscopically crosslinked coating film.

It is clear that the binder components present in a coating material always exhibit at least a proportion of physical curing. If, therefore, it is said that a coating material comprises binder components which are thermally curable, this of course does not rule out the curing including a proportion of physical curing as well.

The basecoat materiel of the invention preferably further comprises at least one polymer as binder that is different from the polyurethane-polyurea polymer present in the dispersion (PD), more particularly at least one polymer selected from the group consisting of polyurethanes, polyesters, polyacrylates and/or copolymers of the stated polymers, more particularly polyesters and/or polyurethane polyacrylates. Preferred polyesters are described, for example, in DE 4009858 A1 in column 6 line 53 to column 7 line 61 and column 10 line 24 to column 13 line 3. Preferred polyurethane-polyacrylate copolymers (acrylated polyurethanes) and their preparation are described in, for example, WO 91/15528 A1, page 3, line 21 to page 20, line 33, and DE 4437535 A1, page 2, line 27 to page 6, line 22. The described polymers as binders are preferably hydroxy-functional and especially preferably possess an OH number in the range from 20 to 200 mg KOH/g, more preferably from 50 to 150 mg KOH/g. The basecoat materials of the invention more preferably comprise at least one hydroxy-functional polyurethane-polyacrylate copolymer, more preferably still at least one hydroxy-functional polyurethane-polyacrylate copolymer and also at least one hydroxy-functional polyester.

The proportion of the further polymers as binders may vary widely and is situated preferably in the range from 0.5 to 20.0 wt %, more preferably 1.0 to 15.0 wt %, very preferably 1.5 to 10.0 wt %, based in each case on the total weight of the basecoat material of the invention.

The basecoat material of, the invention preferably further comprises at least one typical crosslinking agent known per se. It preferably comprises, as a crosslinking agent, at least one aminoplast resin an for a blocked polyisocyanate, preferably an aminoplast resin. Among the aminoplast resin n particular are preferred.

The proportion of the crosslinking agents, more particularly aminoplast resins and/or blocked polyisocyanates, very preferably aminoplast resins and, of these, preferably melamine resins, is preferably in the range from 0.5 to 20.0 wt %, more preferably 1.0 to 15.0 wt %, very preferably 1.5 to 10.0, based in each case on the total weight of the basecoat material of the invention.

Preferably, the coating composition of the invention additionally comprises a least thickener.

Suitable thickeners are inorganic thickeners from the group of the phyllosilicates such as lithium aluminum magnesium silicates. It nevertheless known that coating materials whose profile of rheological properties is determined via the primary or predominant use of such inorganic thickeners are in need of improvement in terms of their solids content, in other words can be formulated only with decidedly low solids contents of less than 20%, for example, without detriment to important performance properties. A particular advantage of the basecoat material of the invention is that it can be formulated without, or without a great fraction of, such inorganic phyllosilicates employed as thickeners. Accordingly, the fraction of inorganic phyllosilicates used as thickeners, based on the total weight of the basecoat material, is preferably less than 0.5 wt %, especially preferably less than 0.1 wt %, and more preferably still less than 0.05 wt %. With very particular preference, the basecoat material is entirely free of such inorganic phyllosilicates used as thickeners.

Instead, the basecoat material preferably comprises at least one organic thickener, as for example a (meth)acrylic acid-(meth)acrylate copolymer thickener or a polyurethane thickener. Employed with preference are associative thickeners, such as the associative polyurethane thickeners known per se, for example. Associative thickeners, as is known, are water-soluble polymers which have strongly hydrophobic groups at the chain ends or in side chains, and/or whose hydrophilic chains contain hydrophobic blocks or concentrations in their interior. As a result, these polymers possess a surfactant character and are capable of forming micelles in aqueous phase. In similarity with the surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Ultimately a thickening effect is achieved, without any increase in sedimentation behavior. Thickeners of this kind are available commercially, as for example, under the trade name Adekanol (from Adeka Corporation).

The proportion of the organic thickeners is preferably in the range from 0.01 to 5.0 wt %, more preferably 0.02 to 3.0 wt %, very preferably 0.05 to 3 based in each case on the total weight of the basecoat material of the invention.

Furthermore, the basecoat material of the invention may further comprise at least one further adjuvant. Examples of such adjuvants are salts which are thermally decomposable without residue or substantially without residue, polymers as binders that are curable physically, thermally and/or with actinic radiation and that are different from the polymers already stated as binders, further crosslinking agents, organic solvents, reactive diluents, transparent pigments, fillers, molecularly dispersively soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Such adjuvants are used in the customary and own amounts.

The solids content of the basecoat material of the invention may vary according to the requirements of the case in hand. The solids content is guided primarily by the viscosity that is needed for application, more particularly spray application. A particular advantage is that the basecoat material of the invention, for a comparatively high solids content, is able nevertheless to have a viscosity which allows appropriate application.

The solids content of the basecoat material of the invention is preferably at least 25%, more preferably at least 30%, especially preferably from 30% to 50%.

Under the stated conditions, in other words a the stated solids contents, preferred basecoat materials of the invention have a viscosity of 40 to 150 mPa·s, more particularly 70 to 85 mPa·s, at 23° C. under a shearing load of 1000 1/s (for further details regarding the measurement method, see Example section). For the purposes of the present invention, a viscosity within this range under the stated shearing load is referred to as spray viscosity (working viscosity). As is known, coating materials are applied at spray viscosity, meaning that under the conditions then present (high shearing load) they possess a viscosity which in particular is not too high, so as to permit effective application. This means that the setting of the spray viscosity is important, in order to allow a paint to be applied at all by spray methods, and to ensure that a complete, uniform coating film is able to form on the substrate to be coated. A particular, advantage is that even a basecoat material of the invention adjusted to spray viscosity possesses a high solids content. The preferred ranges of the solids content, particularly the lower limits, therefore suggest that in the applicable state preferably the basecoat material of the invention has comparatively high solids contents.

The basecoat material of the invention is aqueous (regarding the definition "aqueous", see above).

The fraction of water in the basecoat material of the invention is preferably at least 35 wt %, preferably at least 40 wt %, and more preferably from 45 to 60 wt %.

Even more preferred is for the percentage sum of the solids content of the basecoat material and the fraction of water in the basecoat material to be at least 70 wt %, preferably at least 80 wt %. Among these figures, preference is given to ranges of 70 to 90 wt %, in particular 80 to 90 wt %. In this reporting, the solids content, which traditionally only possesses the unit "%", is reported in "wt %". Since the solids content ultimately also represents a percentage weight figure, this form of representation is justified. If, then, a basecoat material has a solids content of 35% and a water content of 50 wt %, for example, the percentage sum defined above, from the solids content of the basecoat material and the fraction of water in the basecoat material, is 85 wt %.

This means that preferred basecoat materials of the invention contain components that are in principle a burden on the environment, such as organic solvents in particular, at a comparatively low fraction of, for example, less than 30 wt %, preferably less than 20 wt %. Preferred ranges are from 10 to 30 wt %, more particularly 10 to 20 wt %.

Another advantage of the basecoat material of the invention is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly, basecoat material preferably contains less than 10 wt %, preferably less than 5 wt %, more preferably less than 2.5 wt % of organic solvents selected from the group consisting of N-methyl-2-pyrrolidone, dimethylformamide, dioxane, tetrahydrofuran, and N-ethyl-2-pyrrolidone. The basecoat material is preferably entirely free from these organic solvents.

The coating compositions of the invention can be produced using the mixing assemblies a mixing techniques that are customary and known for the production of basecoat materials.

The present invention likewise provides a method for producing multicoat paint systems, in which
(1) an aqueous basecoat material is applied to a substrate,
(2) a polymer film is formed from the coating material applied stage (1),
(3) a clearcoat material is applied to the resulting basecoat film, and then
(4) the basecoat film is cured together with the clearcoat film,
which is characterized in that the aqueous basecoat material used in basecoat material of the invention.

All of the above remarks regarding the basecoat material of the invention also apply to the method of the invention.

Said method is used to produce multicoat color paint systems, multicoat effect paint systems, and multicoat color and effect paint systems.

The aqueous basecoat material for use in accordance with the invention is commonly applied to metallic substrates that have been pretreated with a cured primer-surfacer.

Where a metallic substrate is to be coated, it is preferably further coated with an electrocoat system before the primer-surfacer is applied.

The pigmented aqueous basecoat material of the invention may be applied to a metallic substrate, at the film thicknesses customary within the automobile industry, in the range, for example, of 5 to 100 micrometers, preferably 5 to 60 micrometers. It is usual in this context to employ spray application methods, such as compressed air spraying, airless spraying, high-speed rotation, electrostatic spray application (ESTA), alone or in conjunction with pray application such as hot air spraying, for example.

After the pigmented aqueous basecoat material has been applied, can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers. Preference is given to too-component clearcoat materials.

Following application of the clearcoat material, it may be flashed off at room temperature for 1 to 60 minutes, for example, and optionally dried. The clearcoat material is then cured together with the applied basecoat material. In the course of these procedures, crosslinking reactions occur, for example, to, produce on a substrate a multicoat color and/or effect paint system of the invention. The curing is preferably effected by thermal means, at temperatures of 60 to 200° C.

All the film thicknesses stated in the context of the present invention should be understood as dry film thicknesses. The film thickness is thus that of the cured film in question. Thus, if it is stated that a coating material is applied in a particular film thickness, this should be understood to mean that the coating material is applied such that the stated film thickness results after the curing.

The method of the invention can thus be used to paint in particular metallic substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All the above remarks relating to the aqueous basecoat material of the invention and the method of the invention also apply correspondingly to said multicoat paint system.

A further aspect of the invention relates to the method of, the invention, wherein said substrate from stage (1) is a multicoat paint system having defects. This substrate multicoat paint system having defects is thus an original finish, which is to be repaired ("spot repair") or completely recoated ("dual coating").

The method of the invention is accordingly also suitable for repairing defects on multicoat paint systems. Fault sites or film defects are generally faults on and in the coating, usually named according to their shape or their appearance. The skilled person is aware of a host of possible kinds of such film defects.

The present invention further relates to the use of the dispersion (PD) of the invention and/or of the basecoat material of the invention for improving the performance properties of basecoat materials and/or multicoat paint systems produced using the basecoat material. The invention relates more particularly to the stated use for improving the optical properties of multicoat paint systems, more particularly the stability toward, pinholes and runs, and also for improving the mechanical properties, more particularly the adhesion and the stonechip resistance.

The invention illustrated be examples.

EXAMPLES

Method of Determination

1. Solids Content

Unless otherwise indicated, the solids content, also referred to as solid fraction hereinafter, was determined in accordance with DIN EN ISO 3251 at 130° C.; 60 min, initial mass 1.0 g. If reference is made in the context of the present invention to an official standard, this of course means the version of the standard that was current on the filing date, or, if no current version exists at that date, then the last current version.

2. Isocyanate Content

The isocyanate content, also referred to below as NCO content, was determined by adding an excess of a 2% strength N,N-dibutylamine solution in xylene to a homogeneous solution of the samples in acetone/N-ethylpyrrolidone (1:1 vol %), by potentiometric back-titration of the amine excess with 0.1 N hydrochloric acid, ire a method based on DIN EN ISO 3251, DIN EN ISO 11909 and DIN EN ISO 14896. The NCO content of the polymer, based on solids, can be calculated back via the fraction of a polymer (solids content) in solution.

3. Hydroxyl Number

The hydroxyl number was determined on the basis of R.-P. Krüger, R. Gnauck and R Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anthydride remaining after acetylation and conducting a potentiometric back-titration of the acetic acid with alcoholic potassium hydroxide solution. Acetylation tunes of 60 minutes were sufficient in all cases to guarantee complete conversion.

4. Acid Number

The acid number was determined on the basis of DIN EN ISO 2114 in homogeneous solution of tetrahydrofuran (THF)/water (9 parts by volume of THF and 1 part by volume of distilled water) with ethanolic potassium hydroxide solution.

5. Degree of Neutralization

The degree of neutralization of a component x was calculated from the amount of substance of the carboxylic acid groups present in the component (determined via the acid number) and the amount of substance of the neutralizing agent used.

6. Amine Equivalent Mass

The amine equivalent mass (solution) serves for determining the amine content of a solution, and was ascertained as follows. The sample for analysis was dissolved at room temperature in glacial acetic acid and titrated against 0.1N perchloric acid in glacial acetic acid in the presence of crystal violet. The initial mass of the sample and the consumption of perchloric acid gave the amine equivalent mass (solution), the mass of the solution of the basic amine that is needed to neutralize one mole of perchloric acid.

7. Degree of Blocking of the Primary Amino Groups

The degree of blocking of the primary amino groups was determined by means of IR spectrometry using a Nexus FT IR spectrometer (from Nicolet) with the aid of an IR cell (d=25 m, KBr window) at the absorption maximum at 3310 cm$^{-1}$ on the basis of concentration series of the amines used and standardization to the absorption maximum at 1166 cm internal standard) at 25° C.

8. Solvent Content

The amount of an organic solvent in a mixture, as for example in an aqueous dispersion, was determined by means of gas chromatography (Agilent 7890A, 50 m silica capillary column with polyethylene glycol phase or 50 m silica capillary column with polydimethylsiloxane phase, helium carrier gas, 250° C. split injector, 40-220° C. oven temperature, flame ionization detector, 275° C. detector temperature, n-propyl glycol as internal standard).

9. Number-Average Molar Mass

The number-average molar mass ($M_n$) was determined, unless otherwise indicated, by means of a vapor pressure osmometer 10.00 (from Knauer) on concentration series in toluene at 50° C. with benzophenone as calibration substance for the determination of the experimental calibration constant of the instrument used, by the method of E. Schröder, G. Müller, K. F. Arndt, "Leitfaden der Polymercharakterisierung" [Principles of polymer characterization], Akademie-Verlag, Berlin, pp 47-54, 1982.

10. Average Particle Size

The average particle size (volume average) of the polyurethane-polyurea particles present in the dispersions (PD) of the invention was determined in the context of the present invention by means of photon correlation spectroscopy (PCS).

Employed specifically for the measurement was a Malvern Nano S90 (from Malvern Instruments) at 25±1° C. The instrument covers a size range from to 3000 nm and was equipped with a 4 mW He—Ne laser at 633 nm. The dispersions (PD) were diluted with particle-free, deionized water as dispersing medium, before being subjected to measurement in a 1 ml polystyrene cell at suitable scattering intensity. Evaluation took place using a digital correlator, with the assistance of the Zetasizer analysis software, version 6.32 (from Malvern Instruments). Measurement took place five times, and the measurements were repeated on a second, freshly prepared sample. The standard deviation of a 5-fold determination was ≤4%. The maximum deviation of the arithmetic mean of the volume average (V-average mean) of five individual measurements was ±15%. The reported average particle size (volume average) is the arithmetic mean of the average particle size (volume average) of the individual preparations. Verification was carried out using polystyrene standards having certified particle sizes between 50 to 3000 nm.

In example D3, described later on below, the size of the particles meant that it was not possible to perform determination using photon correlation spectroscopy. Instead, the volume average of the particle size (D[4.3]) was determined by laser diffraction in accordance with ISO 13220, sing a Mastersizer 2000 particle size measuring instrument (from Malvern Instruments). The instrument operates with a red light source (max. 4 mW He—Ne, 633 nm) and a blue light source (max. 0.3 mW LED, 470 nm) and detects particles in the present dispersions in the range from about 0.1 μm to about 2000 μm. In order to set the concentration range appropriate for the measurement, the sample was diluted with particle-free, deionized water as dispersing medium (refractive index: 1.33), the shading of light was set at between 3% and 15%, depending on each sample, and measurement took place in the "Hydro 20000" dispersing unit (from Malvern Instruments). In each case, six measurements were performed at stirring speeds of 2000 1/min and 3000 1/min, and the measurements were repeated on a second, freshly prepared sample. The volume-weighted size distribution was calculated using the Malvern Instruments Software (Version 5.60) by means of Fraunhofer approximation. The reported volume average of the particle size (D[4.3]) is the arithmetic mean of the volume average values for the individual preparations. The particle size measuring instrument was verified using particle size standards in the range from 0.2 to 190 μm.

11. Gel Fraction

The gel fraction of the polyurethane-polyurea particles (microgel particles) present in the dispersions (PD) of the invention is determined gravimetrically in the context of the present invention. Here, first of all, the polymer present was isolated from a sample of an aqueous dispersion (PD) (initial mass 1.0 g) by freeze-drying. Following determination of the solidification temperature—the temperature after which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymer to 25° C., rapid freeze-drying of the polymers was achieved; after a drying time of typically 12 hours, the amount of isolated polymer (solid fraction, determined by the freeze-drying) was constant and no longer underwent any change even on prolonged freeze-drying. Subsequent drying at, a temperature of the surface beneath the polymer of 30° C. with the ambient pressure reduced to maximum (typically between 0.05 and 0.03 mbar) produced optimum drying of the polymer.

The isolated polymer was subsequently sintered in a forced air oven at 130° C. for one minute and thereafter extracted for 24 hours at 25° C. in an excess of tetrahydrofuran (ratio of tetrahydrofuran to solid fraction=300:1). The insoluble fraction of the isolated polymer (gel, fraction) was then separated off on a suitable fit, dried in a forced air oven at 50° C. for 4 hours, and subsequently reweighed.

It was further ascertained that at the sintering temperature of 130° C., with variation in the sintering times between one minute and twenty minutes, the gel fraction found for the microgel particles is independent of sintering time. It can therefore be ruled out that crosslinking reactions subsequent to the isolation of the polymeric solid increase the gel fraction further.

The gel fraction determined in this way in accordance with the invention is also called gel fraction (freeze-dried).

In parallel, a gel fraction, hereinafter also, called gel fraction (130° C.), was determined gravimetrically, by isolating a polymer sample from aqueous dispersion (initial mass 1.0 g) at 130° C. for 60 minutes (solids content). The mass of the polymer was ascertained, after which the polymer was extracted in an excess of tetrahydrofuran at 25° C., in analogy to the procedure described above, for 24 hour after which the insoluble fraction (gel fraction) was separated off, dried, and reweighed.

12. Solubility in Water

The solubility of an organic solvent in water was determined at 20° C. as lows. The respective organic solvent end water were combined in a suitable glass vessel, mixed, and the mixture was subsequently equilibrated. The amounts of water and of the solvent were selected such that two phases separate from one another were obtained after the equilibration. After the equilibration, a sample is taken from the aqueous phase (that is, the phase containing more water than organic solvent) using a syringe, and this sample was diluted with tetrahydro n in a 1/10 ratio, the fraction of the solvent being determined by means of gas chromatography (conditions see section 8. Solvent content).

If two phases do not form irrespective of the amounts of water and the solvent, the solvent is miscible with water in any weight ratio. This solvent that is therefore infinitely soluble in water (acetone, for example) is therefore at any rate not a solvent (12).

Microgel polyurethane-polyurea dispersions

Example D1

Preparation of an Inventive Microgel Dispersion of a Polyesterurethaneurea by Addition of Diethylenetriaminediketimine to the Excess of a Partly Neutralized, Dicyclohexylmethane 4,4'-Diisocyanate-Based Polyurethane Prepolymer in Methyl Ethyl Ketone and Subsequent Crosslinking Via Terminal Primary Amino Groups Following Dispersion in Water A microgel dispersion of a polyesterurethaneurea was prepared a follows:

a) Preparation of a Partly Neutralized Prepolymer Solution

In a reaction vessel equipped with stirrer, internal thermometer, reflux condenser, and electrical heating, 559.7 parts by weight of a linear polyester polyol and 27.2 parts by weight of dimethylolpropionic acid (from GEO Speciality Chemicals) were dissolved under nitrogen in 344.5 parts by weight of methyl ethyl ketone. The linear polyester diol as prepared beforehand from dimerized fatty acid (Pripol® 1012, from Croda), isophthalic acid (from BP Chemicals), and hexane-1,6-diol (from BASF SE) (weight ratio of the starting materials: dimeric fatty acid to isophthalic acid to hexane-1,6-diol=54.00:30.02:15.98), and had a hydroxyl number of 73 mg KOH/g solid fraction, an acid number of 3.5 mg KOH/g solid fraction, a calculated number-average molar mass of 1379 g/mol, and, a number-average molar mass as determined via vapor pressure osmometry of 1350 g/mol.

Added in succession to the resulting solution at 30° C. were 213.2 parts by weight of, dicyclohexylmethene 44'-diisocyanate (Desmodur® W, Bayer Material Science) with an isocyanate content of 32.0 wt %, and 3.8 parts by weight of dibutyltin dilaurate (from Merck). The mixture was then heated to 80° C. with stirring. Stirring was continued at this temperature until the isocyanate content of the solution was constant at 1.49% by weight. Thereafter 628.2 parts by weight of Methyl ethyl ketone were added to the prepolymer, and the reaction mixture was cooled to 40° C. When 40° C. had been reached, 11.8 parts by weight of triethylamine (from BASF SE) were added dropwise over the course of two minutes, and the mixture was stirred for a further 5 minutes.

b) Reaction of the Prepolymer with diethylenetriaminediketimine

Then 30.2 parts by weight of a 71.9 wt % dilution of diethylenetriaminediketimine in methyl isobutyl ketone were mixed in over the course of one minute (ratio of prepolymer isocyanate groups to diethylenetriaminediketimine (having a secondary amino group): 5:1 mol/mol, corresponding to two NCO groups per blocked primary amino group), and the reaction temperature rose by 1° C. briefly following addition to the prepolymer solution. The dilution of diethylenetriaminediketimine in methyl isobutyl ketone was prepared beforehand by azeotropic removal of water of reaction in the reaction of diethylenetriamine (from BASF SE) with methyl isobutyl ketone in methyl isobutyl ketone at 110-140° C. Adjustment to an amine equivalent mass (solution) of 124.0 g/eq was carried out by dilution with methyl isobutyl ketone. Blocking of the primary amino groups of 98.5% was determined by means of IR spectroscopy, on the basis of the residual absorption at 3310 cm$^{-1}$.

The solids content of the polymer solution containing isocyanate groups was found to be 45.3%, c) Dispersion and Vacuum Distillation After 30 minutes of stirring at 40° C., the contents of the reactor were dispersed in 1206 parts by weight of deionized water (23° C.) over the course of 7 minutes. Methyl ethyl ketone was distilled off from the resulting dispersion under reduced pressure at 45° C., and any losses of solvent and water were made up with deionized water, giving a solids content of 40 wt %.

A white, stable, solids-rich, low-viscosity dispersion with crosslinked particles was obtained, which showed no sedimentation at all even after 3 months.

The characteristics of the resulting micro el dispersion were as follows:

| | |
|---|---|
| Solids content (130° C., 60 min, 1 g): | 40.2 wt % |
| Methyl ethyl ketone content (GC): | 0.2 wt % |
| Methyl isobutyl ketone content (GC): | 0.1 wt % |
| Viscosity (23° C., rotary viscometer, shear rate = 1000/s): | 15 mPa · s |
| Acid number | 17.1 mg KOH/g Solids content |
| Degree of neutralization (calculated) | 49% |
| pH (23° C.) | 7.4 |
| Particle size (photon correlation spectroscopy, volume average) | 167 nm |
| Gel fraction (freeze-dried) | 85.1 wt % |
| Gel fraction (130° C.) | 87.3 wt % |

Example D2

Preparation of an Inventive Microgel Dispersion of a polyesterurethaneurea by Addition of N,N)-Bis(3-Aminopropyl)Ethylenediaminediketimine to the Excess of a Partly Neutralized, Dicyclohexylmethane 4,4'-Diisocyanate-Based Polyurethane Prepolymer in Methyl Ethyl Ketone and Subsequent Crosslinking Via Central Primary Amino Groups Following Dispersion in Water A microgel dispersion of a polyesterurethaneurea was prepared as follows: The amount of partly neutralized prepolymer solution prepared in inventive example D1 (D1, section a, 1786.4 parts by weight) was conditioned at 40° C., and then 35.7 parts by weight of a 77.0 wt % dilution of N,N'-bis(3-aminopropyl)ethylenediaminediketimine in methyl isobutyl ketone were mixed in over the course of one minute (ratio of prepolymer isocyanate groups to N,N'-bis (3-aminopropyl)ethylenediaminediketimine (with two secondary amino groups): 6:1 mol/mol corresponding to two NCO groups per blocked primary amino group), the reaction temperature rising briefly by 1° C. following addition to the prepolymer solution, with an increase in the viscosity as well. The dilution of N,N-bis(3-aminopropyl)ethylenediaminediketimine in methyl isobutyl ketone was prepared beforehand by azeotropic removal of water of reaction in the reaction of N,N'-bis(3-aminopropyl)ethylenediamine (from BASF SE) with methyl isobutyl ketone in methyl isobutyl ketone at 110-140° C. Adjustment to an amine equivalent mass (solution) of 119.0 g/eq was carried out by dilution with methyl isobutyl ketone Blocking of the primary amino groups of 99.0% was ascertained by means of IR spectroscopy, from the residual absorption at 3310 cm$^{-1}$.

The solids content of the polymer solution containing isocyanate groups was found to be 45.1%. After 30 minutes of stirring at 40° C., the contents of the reactor were dispersed in 1214 parts by weight of deionized water (23° C.) over the course of 7 minutes. Methyl ethyl ketone was distilled off from the resulting dispersion under reduced pressure at 45° C., and any losses of solvent and water were made up with deionized water, giving a solids content of 40 wt %.

A white, stable, solids-rich, low-viscosity dispersion with crosslinked particles was obtained, which showed no sedimentation at all even after 3 months.

The characteristics of the resulting microgel dispersion were as follows:

| | |
|---|---|
| Solids content (130° C., 60 min, 1 g): | 39.8 wt % |
| Methyl ethyl ketone content (GC): | 0.2 wt % |
| Methyl isobutyl ketone content (GC): | 0.1 wt % |
| Viscosity (23° C., rotary viscometer, shear rate = 1000/s): | 35 mPa · s |
| Acid number | 17.2 mg KOH/g Solids content |
| Degree of neutralization (calculated) | 49% |
| pH (23° C.) | 7.5 |
| Particle size (photon correlation spectroscopy, volume average) | 172 nm |
| Gel fraction (freeze-dried) | 96.1 wt % |
| Gel fraction (130° C.) | 96.8 wt % |

Example D3

Preparation of a Noninventive Microgel Dispersion of a Polyesterurethaneurea by Addition of Diethylenetriaminediketimine to the Excess of a Partly Neutralized, Dicyclohexylmethane 4,4'-Diisocyanate-Based Polyurethane Prepolymer in Acetone and Subsequent Crosslinking Via Terminal Primary Amino Groups Following Dispersion in Water The noninventive microgel dispersion of a polyesterurethaneurea D3 was prepared as in the inventive example D1; the methyl ethyl ketone solvent for preparing a partly neutralized prepolymer solution was just replaced by acetone, and the reaction temperature of originally 80° C. when using methyl ethyl ketone was limited to 58° C., when using acetone. Stirring was carried out at this temperature until the isocyanate content of the solution, as in example D1, was constant at 1.49 wt %; only the reaction time had increased. Thereafter, in analogy to example D1, the prepolymer was diluted with acetone, cooled to 40° C., and partly neutralized, and subsequently was reacted using the amount of diethylenetriaminediketimine indicated in example D1 in methyl isobutyl ketone (ratio of isocyanate groups of the prepolymer to diethylenetriaminediketimine (having one secondary amino group): 5:1 mol/mol, corresponding to two NCO groups per blocked primary amino group), the solids content of the polymer solution containing isocyanate groups was found to be 45.4%: following dispersion in water, removal of the solvent at 35-40° C. under reduced pressure, and compensation of the water losses with deionized water, a white, solids-rich, low-viscosity dispersion with crosslinked particles was obtained.

The microgel dispersion is unstable, and formed a sediment of 3 wt % of the total mass of the resulting polymer within two days.

The characteristics of the resulting microgel dispersion were as follows:

| | |
|---|---|
| Solids content (130° C., 60 min, 1 g): | 40.5 wt % |
| Acetone content (GC): | 0.0 wt % |
| Methyl isobutyl ketone content (GC): | 0.1 wt % |
| Viscosity (23° C., rotary viscometer, shear rate = 1000/s): | 13 mPa · s |
| Acid number | 17.0 mg KOH/g Solids content |
| Degree of neutralization (calculated) | 49% |
| pH (23° C.) | 7.4 |
| Volume average of the particle size (D[4.3]) (Laser diffraction, Fraunhofer) | 9.8 μm |
| Gel fraction (freeze-dried) | 87.4 wt % |
| Gel fraction (130° C.) | 89.9 wt % |

Example D4

Preparation of an Inventive Microgel dispersion of a polyesterurethaneurea by Addition of Diethylenetriaminediketimine to the Excess of a Partly Neutralized, Isophorone Diisocyanate-Based Polyurethane Prepolymer in Methyl Ethyl Ketone and Subsequent Crosslinking via Terminal Primary Amino Groups Following Dispersion in Water A microgel dispersion of a polyesterurethaneurea was prepared as follow a) Preparation of a Partly Neutralized Prepolymer Solution In a reaction vessel equipped with stirrer, internal thermometer, reflux condenser electrical heating, 583.0 parts by weight of the linear polyester polyol from example D1 and 28.4 parts by weight of dimethylolpropionic acid (from GEO Speciality Chemicals) were dissolved under nitrogen in 344.3 parts by weight of methyl ethyl ketone.

The resulting solution was admixed at 30° C. in succession with 188.2 parts by weight of isophorone diisocyanate (Basonat® I, from BASF SE) with an isocyanate content of 37.75 wt %, and with 3.8 parts by weight of dibutyltin dilaurate (from Merck). The mixture was then heated to 80° C. with stirring. Stirring was continued at this temperature until the isocyanate content of the solution was constant at 1.55 wt %. Thereafter 626.0 parts by weight of methyl ethyl ketone were added to the prepolymer, and the reaction mixture was cooled to 40° C. When 40° C. had been reached, 12.3 parts by weight of triethylamine (from BASF SE) were added dropwise over the course of two minutes, and the batch was stirred for a further 5 minutes.

b) Reaction of the Pre Polymer with diethylenetriaminediketimine

Subsequently, 31.5 parts by weight of a 71.9 wt % dilution of diethylenetriaminediketimine in methyl isobutyl ketone, described in example D1, section b (amine equivalent mass (solution); 124.0 g/eq; ratio of prepolymer isocyanate groups to diethylenetriaminediketimine (with one secondary amino group): 5:1 mol/mol; corresponds to two NCO groups per blocked primary amino group) were admixed over the course of a minute, the reaction temperature rising briefly by 1° C. after addition to the prepolymer solution.

The solids content of the polymer solution containing isocyanate groups was found to be 45.1%.

c) Dispersion and Vacuum Distillation

After 30 minutes of stirring at 40° C., the contents of the reactor were dispersed in 1205 parts by weight of deionized water (23° C.) over the course of 7 minutes. Methyl ethyl ketone was distilled off under reduced pressure at 45° C. from the resulting dispersion, and any losses of solvent and water were compensated with deionized water, to give a solids content of 40 wt %.

A white, stable, solids-rich, low-viscosity dispersion containing crosslinked particles was obtained, and showed no sedimentation whatsoever even after 3 months.

The characteristics of the resulting microgel dispersion were as follows:

| | |
|---|---|
| Solids content (130° C., 60 min, 1 g): | 40.2 wt % |
| Methyl ethyl ketone content (GC): | 0.2 wt % |
| Methyl isobutyl ketone content (GC): | 0 0 wt % |
| Viscosity (23° C., rotary viscometer, shear rate = 1000/s): | 19 mPa · s |
| Acid number | 17.3 mg KOH/g Solids content |
| Degree of neutralization (calculated) | 49% |
| pH (23° C.) | 7.4 |
| Particle size (photon correlation spectroscopy, volume average) | 151 nm |
| Gel fraction (freeze-dried) | 84.0 wt % |
| Gel fraction (130° C.) | 85.2 wt % |

Example D5

Preparation of an Inventive Microgel Dispersion of a polyesterurethaneurea by Addition of Diethylenetriaminediketimine to the Excess of a Partly Neutralized, M-Tetramethylxylene Diisocyanate-Based Polyurethane Prepolymer in Methyl Ethyl Ketone and Subsequent Crosslinking via Terminal Primary Amino Groups Following Dispersion in Water A microgel dispersion of a polyesterurethaneurea was prepared as follows:

a) Preparation of a Partly Neutralized Prepolymer Solution

In a reaction vessel equipped with stirrer, internal thermometer, reflux condenser, and electrical heating, 570.0 parts by weight of the linear polyester polyol from example D1 and 27.7 parts by weight of dimethylolpropionic acid (from GEO Speciality Chemicals) were dissolved under nitrogen in 344.4 parts by weight of methyl ethyl ketone.

Added to the resulting solution at 30° C. in succession were 202.0 parts by weight of m-tetramethylxylene diisocyanate (TMXDI® (Meta) aliphatic isocyanate, from Cytec), with an isocyanate content of 34.40 wt %, and 3.8 parts by weight of dibutyltin dilaurate (from Merck). This was followed by heating to 80° C. with stirring. Stirring was continued at this temperature until the isocyanate content of the solution was constant at 1.51 wt %. Thereafter 626.4 parts by weight of methyl ethyl ketone were added to the prepolymer and the reaction mixture was cooled to 40° C. When 40° C. had been reached, 12.0 parts by weight of triethylamine (from BASF SE) were added dropwise over the course of two minutes and the batch was stirred for a further 5 minutes.

b) Reaction of the Prepolymer with diethylenetriaminediketimine

Subsequently 30.8 parts by weight of a 7.9 wt % dilution, described in example D1, section b, of diethylenetriaminediketimine in methyl isobutyl ketone were mixed in over the course of a minute (amine equivalent mass (solution); 124.0 g/eq; ratio of prepolymer isocyanate groups to diethylenetriaminediketimine (having one secondary amino group): 51 mol/mol; corresponding to two NCO groups per blocked primary amino group), the reaction temperature rising briefly by 1° C. after addition to the prepolymer solution.

The solids content of the polymer solution containing isocyanate groups was found to be 45.0%.

c) Dispersion and Vacuum Distillation

After 30 minutes of stirring at 40° C., the contents of the reactor were dispersed in 1206 parts by weight of deionized water (23° C.) over the course of 7 minutes. Methyl ethyl ketone was distilled off from the resulting dispersion under reduced pressure at 46° C., and any losses of solvent and of water ere made up with deionized water, giving a solids content of 40 wt %.

A white, stable, solids-rich, low-viscosity dispersion with crosslinked particles was obtained, and showed no sedimentation at all even after 3 months.

The characteristics of the resulting microgel dispersion were as follows:

| | |
|---|---|
| Solids content (130° C., 60 min, 1 g): | 39.6 wt % |
| Methyl ethyl ketone content (GC): | 0.3 wt % |
| Methyl isobutyl ketone content (GC): | 0.1 wt % |
| Viscosity (23° C., rotary viscometer, shear rate = 1000/s): | 15 mPa · s |
| Acid number | 17.1 mg KOH/g Solids content |
| Degree of neutralization (calculated) | 49% |
| pH (23° C.) | 7.4 |
| Particle size (photon correlation spectroscopy, volume average) | 156 nm |
| Gel fraction (freeze-dried) | 83.3 wt % |
| Gel fraction (130° C.) | 83.7 wt % |

Example D6

Preparation of a Noninventive Microgel Dispersion of a Polyesterurethaneurea by Addition of Diethylenetriaminediketimine to the Excess of a Partly Neutralized Dicyclohexylmethane 4,4'-Diisocyanate-Based Polyurethane Prepolymer in Methyl Ethyl Ketone at Increased Solids Content and Subsequent Crosslinking Via Terminal Primary Amino Groups Following Dispersion in Water The noninventive microgel dispersion of a polyesterurethaneurea D6 was prepared as in inventive example D1, except that the amount of methyl ethyl ketone was reduced so as to give the solution (Z) an amount of 70.1% of intermediate containing isocyanate groups and having blocked primary amino groups (Z.1); subsequently, following dispersion in water, removal a solvent at 45° C. under reduced pressure, and compensation of the water losses with deionized water, a white, solids-rich, low-viscosity dispersion with crosslinked particles was obtained.

The ratio of isocyanate groups in the prepolymer to diethylenetriaminediketimine (having one secondary amino group) remained unchanged at 5:1 corresponding to two NCO groups per blocked primary amino group). The degree of neutralization (calculated) also remained the same.

A white, solids-rich, low viscosity dispersion large, crosslinked particles was obtained, which showed a sediment approximately 0.2 wt % of the total mass if the polymer present after 3 months. When the dispersion was filtered, difficulties arose because of rapid clogging of the filters used.

The characteristics of the resulting microgel dispersion were as follows:

| | |
|---|---|
| Solids content (130° C., 60 min, 1 g): | 39.8 wt % |
| Methyl ethyl ketone content (GC): | 0.2 wt % |
| Methyl isobutyl ketone content (GC): | 0.1 wt % |
| Viscosity (23° C., rotary viscometer, shear rate = 1000/s): | 14 mPa · s |
| Acid number | 17.2 mg KOH/g Solids content |
| Degree of neutralization (calculated) | 49% |
| pH (23° C.) | 7.4 |
| Particle size (photon correlation spectroscopy, volume average) | 2860 nm |
| Volume average of the particle size (D[4.3]) (Laser diffraction, Fraunhofer) | 3.8 μm |
| Gel fraction (freeze-dried) | 85.9 wt % |
| Gel fraction (130° C.) | 87.9 wt % |

Further Aqueous polyurethane-based Dispersions

Besides the prepared inventive microgel dispersions D1, D2, D4, and D5, and also the noninventive micro & dispersions D3 and D6, further, noninventive polyurethane dispersions were prepared or their preparation attempted.

Comparative Example VD1

Preparation of a Dispersion of a Polyesterurethane by Dispersion of a Methyl Ethyl Ketone Solution of a Partly Neutralized, Dicyclohexylmethane 4,4' Diisocyanate-Based Polyesterurethane A standard polyurethane dispersion VD1 was prepared on the basis of dicyclohexylmethane 4,4'-diisocyanate in accordance with WO 92/15405, page 15, lines 16-20.

The characteristics of the resulting polyurethane dispersion were follows:

| | |
|---|---|
| Solids content (130° C., 60 min, 1 g): | 27.0 wt % |
| Methyl ethyl ketone content (GC): | 0.2 wt % |
| Viscosity (23° C., rotary viscometer, shear rate = 1000/s): | 135 mPa · s |
| Acid number | 19.9 mg KOH/g Solids content |
| pH (23° C.) | 7.8 |
| Particle size (photon correlation spectroscopy, volume average) | 46 nm |
| Gel fraction (freeze-dried) | −0.7 wt % |
| Gel fraction (130° C.) | −0.3 wt % |

Comparative Example VD2

Preparation of a Dispersion of a Polyesterurethaneurea by Dispersion of a Methyl Ethyl Ketone Solution of a Partly Neutralized, Dicyclohexylmethane 4,4'-Diisocyanate-Based Polyurethane Prepolymer Having Free Isocyanate Groups in Water (without Addition of Ketimine or Further Amine)

The amount of partially neutralized prepolymer solution prepared in inventive example D1 (D1, section a, 1766.4 parts by weight) was conditioned at 40° C. and dispersed in 1193 parts by weight of deionized water (23° C.) over the course of 7 minutes, with stirring, without addition of diketimine or further amine. The methyl ethyl ketone was distilled from the resulting dispersion under reduced pressure at 45° C., and any losses of solvent and water were made up with deionized water, to give a solids content of 40 wt %.

The dispersion was subsequently conditioned at 40° C. for 24 hours, the formation of carbon dioxide being observed in the first few hours. After 24 hours, further evolution of carbon dioxide was no longer found.

A white, sedimentation-stable, solids-rich, low-viscosity dispersion was obtained, which was noncrosslinked.

The gel fraction was determined immediately after vacuum distillation and adjustment of the solids content with deionized water, and also on a dispersion conditioned subsequently at 40° C. for 24 hours. The determination was repeated after four weeks of conditioning at 40° C.

The characteristics of the resulting polymer dispersion were as follows:

| | |
|---|---|
| Solids content (130° C., 60 min, 1 g): | 39.6 wt % |
| Methyl ethyl ketone content (GG): | 0.2 wt % |
| Viscosity (23° C., rotary viscometer, shear rate = 1000/s); | 45 mPa · s |
| Acid number | 17.3 mg KOH/g Solids content |
| Degree of neutralization (calculated) | 49% |
| pH (23° C.) | 7.6 |
| Particle size (photon correlation spectroscopy, volume average) | 172 nm |
| Gel fraction (freeze-dried) | −1.2 wt % |
| Gel fraction (130° C.) | 1.8 wt % |
| Gel fraction (freeze-dried) (dispersion after 24 hours, 40° C.) | 1.0 wt % |
| Gel fraction (130° C.) (dispersion after 24 hours, 40° C.) | 3.6 wt % |
| Gel fraction (freeze-dried) (dispersion after 4 weeks, 40° C.) | 1.1 wt % |
| Gel fraction (130° C.) (dispersion after 4 weeks, 40° C.) | 2.9 wt % |

Comparative Example VD3

Attempted Preparation of a Microgel Dispersion of a Polyesterurethaneurea by Addition of Diethylenetriamine to the Excess of Partly Neutralized, Dicyclohexylmethane 4,4'-Diisocyanate-Based Polyurethane Prepolymer in Methyl Ethyl Ketone and Dispersion in Water Admixed over the course of one minute to the amount, prepared in inventive example D1, of partially neutralized prepolymer solution (D1, section a, 1756A parts by weight) at 40° C. were 8.4 parts by weight of diethylenetriamine (from BASF SE) (ratio of prepolymer isocyanate groups to diethylenetriamine: 5:1 mol/mol of corresponding to two NCO groups per primary amino group), the reaction temperature rising briefly by TC, and the viscosity increasing, following addition to the prepolymer solution. The solids content of the polymer solution was found to be 45.0%.

Dispersion in deionized water did not occur after 30 minutes, since after just 21 minutes the reaction mixture had completely gelled.

Comparative Example VD4

Preparation of a Dispersion of a polyesterurethaneurea by Addition of ethylenediamine to the Excess of a Partially Neutralized, dicyclohexylmethane 4,4'-diisocyanate-containing polyurethane prepolymer in methyl ethyl ketone and Dispersion in Water A dispersion of a polyesterurethaneurea was prepared as follows:

The amount, prepared in inventive example D1, of partially neutralized prepolymer solution (D1, section a, 1786.4 parts by weight) was conditioned at 40° C. and then 6.1 parts by weight of ethylenediamine (from BASF SE) were admixed over the course of one minute (ratio of prepolymer isocyanate groups to, ethylenediamine (without secondary amino groups): 4:1 mol/mol; corresponding to two NCO groups per primary amino group), the reaction temperature rising briefly by VC after addition to the prepolymer solution. The solids content of the polymer solution was found to be 45.3%.

After 30 minutes of stirring at 40° C., the contents of the reactor were divided, and one half was dispersed in 601 parts by weight of deionized water (23° C.) over the course of 7 minutes. The other half remained in the reactor and was stirred at 40° C. for 12 hours more, without any gelling of the reaction mixture occurring.

From the resulting dispersion, the methyl ethyl ketone was distilled off under reduced pressure at 45° C., and any losses of solvent and water were made up with deionized water, to give a solids content of 40 wt %.

A white, stable, solids-rich, low-viscosity dispersion with noncrosslinked particles was obtained which therefore had no microgel particles.

The characteristics of the resulting dispersion were as follows:

| | |
|---|---|
| Solids content (130° C., 60 min, 1 g): | 39.9 wt % |
| Methyl ethyl ketone content (GC): | 0.2 wt % |
| Viscosity (23° C., rotary viscometer, shear rate = 1000/s): | 55 mPa · s |
| Acid number | 17.2 mg KOH/g Solids content |
| Degree of neutralization (calculated) | 49% |
| pH (23° C.) | 7.4 |
| Particle size (photon correlation spectroscopy, volume average) | 157 nm |
| Gel fraction (freeze-dried) | −0.3 wt % |
| Gel fraction (130° C.) | −1.1 wt % |

Evaluation of the polymer Dispersions for use in Silver-Blue Waterborne Basecoat Materials, and Preparation of Further polymer Dispersions For the application comparison, a polyurethane dispersion VD1 containing no crosslinked particles, was prepared, this polyurethane dispersion being widespread in waterborne basecoat materials (according to WO 92/15405, page 15, lines 16-20).

Likewise prepared for purposes of comparison was a solids-rich polyurethane each dispersion VD4, which formed following addition of ethylenediamine to the prepolymer after dispersion in water but contained no microgels. It was therefore possible to show that the chain extension by means of ethylenediamine, in spite of a high isocyanate excess, was not suitable for providing crosslinked particles.

The preparation of waterborne basecoat material with pith the dispersion VD2 prepared for purposes of comparison, said dispersion having been generated directly in water after dispersion of the prepolymer containing isocyanate groups, was not carried out, since, despite the observation that a finely divided, stable dispersion is formed after dispersion and reaction of the free isocyanate groups with, water, with vigorous evolution of $CO_2$, this procedure nevertheless proved, surprisingly, not to be suitable for producing microgel dispersion. Following determination of the gel fraction, crosslinked particles were found only to a very small extent, if at all.

The reaction of the prepolymer solution with nonblocked diethylenetriamine did indeed lead to the complete gelling of the organic resin solution within a short time in comparative example VD3, in spite of high dilution, even before the desired dispersion in water; however, it was not possible to prepare a microgel dispersion in this way.

Microgel dispersions having high gel fractions were obtained in the inventive experiments D1, D2, D4, and D5 and also in the noninventive experiments D3 and D6.

When the solvent (Z.2) (presently methyl ethyl ketone) was replaced by a different it solvent (presently acetone) during the preparation of a prepolymer (Z.1.1) or a composition (Z), a microgel dispersion D3 was prepared which contained particles that were much too large. In view of the stability problems as a consequence of the large microgel particles, a waterborne basecoat material was not prepared. The storage stability of such systems is inadequate. In preparation example D6 as well, a microgel dispersion was obtained. However, the particle size of the resulting microgel particles, with a relatively high amount of the intermediate (LI) in the composition (Z), prior to dispersing (70.1% relative to 45.3% in preparation example D1), was significantly increased, and this adversely affected the long-term stability of the dispersion. Once again, because of the poor storage stability, the preparation of basecoat materials and their subsequent application were not carried out.

For the further analysis of the influence of the fraction of the intermediate (Z.1) in the composition (Z), further microgel dispersions were prepared, in this case, preparation of dispersion D1, only the fraction of the intermediate (Z.1) in the was varied in each case.

Table I. shows the microgel dispersions prepared, particularized in relation to the particle size. Dispersions D1 and D6 are likewise listed. For greater ease of comprehension, dispersion D1 is listed as dispersion Df, and dispersion D6 as dispersion Dk. All dispersions contained polymer particles with a gel fraction of more than 80%.

TABLE I

| Dispersion | Fraction of (Z.1) in (Z) in wt % | Average particle size in nm (determined via PCS) |
|---|---|---|
| Da | 20.1 | 1360 |
| Db | 30.0 | 394 |
| Dc | 35.0 | 266 |
| Dd | 40.0 | 155 |
| De | 42.5 | 162 |
| Df (=D1) | 45.3 | 167 |
| Dg | 47.5 | 158 |
| Dh | 50.0 | 155 |
| Di | 55.2 | 970 |
| Dj | 60.0 | 1645 |
| Dk (=D6) | 70.1 | 28607/3800[1] |

[1]The value of 3800 nm was measured by means of laser diffraction.

The results show that the fraction of the intermediate (Z.1) position (Z) and hence also the solids content of this composition must, surprisingly, not be too high, so as to give microgel dispersions in which the polyurethane-polyurea particles present have average particle sizes within the acceptable range. Likewise surprisingly, the average particle sizes become larger again even when the fractions of the intermediate become very small. However, at fractions of the intermediate which are too small, and hence at high fractions of organic solvents, there is no longer any further benefit anyway, owing to the environmental and economic disadvantages.

Overall it is found that fractions of the intermediate that become relatively high and also fractions of the intermediate that become very low are accompanied by a rapid increase in the average particle sizes of the polyurethane-polyurea particles.

Preparation Blue Waterborne Basecoat Materials

For the application comparison, a polyurethane dispersion VD1 (according to WO 92/15405, page 15, lines 16-20) was used to prepare a standard waterborne basecoat material BL-V1, which, in contrast to all inventively prepared waterborne basecoat materials, was equipped with a phyllosilicate thickener, as also in patent application WO 92/15405, in order to prevent vertical running from the metal panel during application and drying.

A phyllosilicate-free waterborne basecoat material was likewise prepared for comparison purposes, on the basis of a high-solids polyurethaneurea dispersion VD4, which formed following addition of ethylenediamine to the prepolymer after dispersion in water, but which contained no microgels.

Waterborne basecoat materials (BL-A1 to BL-A4) were prepared from the inventively prepared microgel dispersions D1, D2, D4, and D5, these basecoat materials, in contrast to the standard waterborne basecoat material BI-V1, being free from phyllosilicate thickeners.

The preparation of the waterborne basecoat materials is described in detail hereinafter.

Preparation of a Silver-Blue Waterborne Basecoat Material BL-V1 as Comparative Example, based on a polyurethane Dispersion VD1 with polyurethane Particles Which are not Crosslinked, and Amenable to Direct Application as a Coloring Coat onto a Cured Surfacer The components listed under "aqueous phase" in Table 1 are stirred together in the prescribed order to form an aqueous mixture. In the next step, an organic mixture is prepared from the components listed under "organic phase". The organic mixture is added to the aqueous mixture. The combined mixture is then stirred for 10 minutes and adjusted, using deionized water and N,N-dimethylethanolamine (from BASF SE), to a pH of 8.1 and to a spray viscosity of 73 mPa·s under a shearing load of 1000 as measured with a rotary viscometer (Rheomat RM 180 instrument from Mettler-Toledo) at 23° C.

TABLE 1

Preparation of a silver-blue waterborne basecoat material BL-V1

| Designation of the waterborne basecoat material Component | BL-V1 Parts by weight |
|---|---|
| AQUEOUS PHASE | |
| Aqueous solution of 3% sodium lithium magnesium phyllosilicate Laponite ® RD (from Altana-Byk) and 3% Pluriol ® P900 (from BASF SE) | 24.7 |

TABLE 1-continued

Preparation of a silver-blue waterborne basecoat material BL-V1

| Designation of the waterborne basecoat material<br>Component | BL-V1<br>Parts by weight |
|---|---|
| VD-1 Polyurethane dispersion, prepared according to page 15, Lines 16-20 of WO 92/15405 | 18 |
| Hydroxy-functional polyester; prepared as per example D, column 16, lines 37-59 of DE-A-4009858 | 3.2 |
| Luwipal ® 052 (from BASF SE), melamine-formaldehyde resin | 4.3 |
| TMDD 50% BG (from BASF SE), 52% strength solution of 2,4,7,9-tetramethyl-5-decyne-4,7-diol in butyl glycol | 1.9 |
| 10% strength solution of N,N-dimethylethanolamine (from BASF SE) in water | 0.8 |
| Butyl glycol (from BASF SE) | 5.7 |
| Hydroxy-functional, polyurethane-modified polyacrylate; prepared as per page 7. line 55 to page 8, line 23 of DE 4437535 A1 | 4.7 |
| 10 wt % Strength solution of Rheovis ® AS 1130 (BASF SE), rheological agent | 4 |
| 50 wt % strength solution of Rheovis ® PU 1250 (BASF SE), rheological agent | 0.47 |
| Isopropanol (from BASF SE) | 1.9 |
| Triethylene glycol (from BASF SE) | 2.4 |
| 2-Ethylhexanol (from BASF SE) | 2 |
| Isopar ® L (from ExxonMobil Chemical), solvent (isoparaffinic hydrocarbon) | 1 |
| Carbon black paste | 4.3 |
| Blue paste | 6.9 |
| Red paste | 0.23 |
| Interference pigment slurry | |
| Iriodin ® 9119 Polarweiβ SW (from Merck), a silver-white interference pigment; mica, coated with rutile (TiO$_2$) | 1 |
| Iriodin ® 9225 SQB Rutil Perlblau SW (from Merck), a blue interference pigment; mica, coated with rutile (TiO$_2$) | 0.06 |
| Mixing varnish, prepared as per column 11, lines 1-17 of EP 1534792 - B1 | 3.2 |
| Deionized water | 7.98 |
| ORGANIC PHASE | |
| Mixture of two commercial aluminum pigments STAPA Hydrolux 1071 aluminum and STAPA Hydrolux VP No, 56450/G aluminum (from Eckart Effect Pigments) | 0.36 |
| Butyl glycol (from BASF SE) | 0.5 |
| Hydroxy-functional polyester; prepared as per example D, column 16, lines 37-59 of DE-A-4009858 | 0.3 |
| 10% strength solution of N,N-dimethylethanolamine (from BASF SE) in water (for the adjustment of pH and spray viscosity) | 0.1 |

Production of the Carbon Black Paste

The carbon black paste was produced from 57 parts by weight of acrylated polyurethane dispersion, prepared as per international patent application WO 91/1552 binder dispersion A, 10 parts by weight of Monarch® 1400 carbon black, 6 parts by weight of dimethylethanolamine (10% strength in D1 water), 2 parts by weight of a commercial polyether (Pluriol® P900 from BASF SE), and 25 parts by weight of deionized water.

Production of the Blue Paste

The blue paste was produced from 59 parts by weight of an acrylated polyurethane dispersion prepared as per international patent application WO 91/15528 binder dispersion A, 25 parts by weight of Palomar Blue® 15:1, 1.3 parts by weight of dimethylethanolamine (10% strength in D1 water), 0.25 part by weight of Parmetol® N 20, 4 parts by weight of a commercial polyether (Pluriol® P900 from BASF SE), 2 parts by weight of butyl glycol, and 10.45 parts by weight of deionized water.

Production of the Red Paste

The red paste was produced from 38.4 parts by weight of an acrylated polyurethane dispersion prepared as per international patent application WO 91115528 binder dispersion A, 47.1 parts by weight of Bayferrox® 13 BM/P, 0.6 part by weight of dimethylethanolamine (10% strength in D1 water); 4.7 parts by weight of a commercial polyether (Pluriol® P900 front BASF SE), 2 parts by weight of butyl glycol, and 7.2 parts by weight of deionized water.

Preparation of Invention Silver-Blue Waterborne Basecoat Materials Which Contain polyurethaneurea Microgels (BL-A1 to BL-A4) and Which can be Applied Directly as a Coloring Coat to a Cured Surfacer; and Preparation, as Comparative Example, of a Silver-Blue Waterborne Basecoat Material with polyurethaneurea Particles Which are not Crosslinked (BL-V2)

The components listed under "aqueous phase" in Table 2 are stirred together in the order stated to form an aqueous mixture. In the next step an organic mixture is prepared from the components listed under "organic phase". The organic mixture is added to the aqueous mixture. The combined mixture is then stirred for 10 minutes and adjusted using deionized water and N,N-dimethylethanolamine (from BASF SE), to a pH of 81 and to a spray viscosity of 80±5 mPa·s under a shearing load of 1000 measured with a rotary viscometer (Rheomat RM 180 instrument from Mettler-Toledo) at 23° C.

TABLE 2

Preparation of silver-blue waterborne basecoat materials BL-A1 to BL-A4 and BL-B2

| | Designation of the waterborne basecoat material | | | | |
|---|---|---|---|---|---|
| Component | BL-A1 | BL-A2 | BL-A3 | BL-A4 | BL-V2 |
| | Parts by weight | | | | |
| AQUEOUS PHASE | | | | | |
| Butyl glycol | 2.000 | 2.000 | 2.000 | 2.000 | 2.000 |
| Hydroxy-functional polyester, prepared as per example D, page 10 of DE 4009858 C2, | 3.200 | 3.200 | 3.200 | 3.200 | 3.200 |
| Luwipal ® 052 (from BASF SE), Melamine-formaldehyde resin | 4.300 | 4.300 | 4.300 | 4.300 | 4.300 |
| 10% strength solution of N,N-dimethylethanolamine (from BASF SE) in water | 0.600 | 0.600 | 0.600 | 0.600 | 0.600 |

TABLE 2-continued

Preparation of silver-blue waterborne basecoat
materials BL-A1 to BL-A4 and BL-B2

| Component | BL-A1 | BL-A2 | BL-A3 | BL-A4 | BL-V2 |
|---|---|---|---|---|---|
| | Parts by weight | | | | |
| Hydroxy-functional, polyurethane-modified polyacrylate, prepared as per example D, pages 7-8 of DE 4437535 A1 | 4.700 | 4.700 | 4.700 | 4.700 | 4.700 |
| PU microgel dispersion as per preparation example D1 | 12.400 | | | | |
| PU microgel dispersion as per preparation example D2 | | 12.525 | | | |
| PU microgel dispersion as per preparation example D4 | | | 12.400 | | |
| PU microgel dispersion as per preparation example D5 | | | | 12.588 | |
| PU dispersion as per preparation example VD4 | | | | | 12.493 |
| Butyl glycol | 2.000 | 2.000 | 2.000 | 2.000 | 2.000 |
| Adekanol ® UH-756VF (from Adeka), a polyurethane associative thickener | 0.150 | 0.150 | 0.150 | 0.150 | 0.150 |
| Deionized water | 1.000 | 1.000 | 1.000 | 1.000 | 1.000 |
| Carbon black paste | 4.300 | 4.300 | 4.300 | 4.300 | 4.300 |
| Blue paste | 6.900 | 6.900 | 6.900 | 6.900 | 6.900 |
| Red paste | 0.230 | 0.230 | 0.230 | 0.230 | 0.230 |
| Deionized water | 1.000 | 1.000 | 1.000 | 1.000 | 1.000 |
| Tris(2-butoxyethyl)phosphate (from Solvay) | 3.000 | 3.000 | 3.000 | 3.000 | 3.000 |
| Deionized water | 9.000 | 9.000 | 9.000 | 9.000 | 9.000 |
| Interference pigment suspension | | | | | |
| PU microgel dispersion as per preparation example D1 | 2.200 | | | | |
| PU microgel dispersion as per preparation example D2 | | 2.222 | | | |
| PU microgel dispersion as per preparation example D4 | | | 2.200 | | |
| PU microgel dispersion as per preparation example 05 | | | | 2.233 | |
| PU dispersion as per preparation example VD4 | | | | | 2.217 |
| Iriodin ® 9119 Polarweiß SW (from Merck), a silver-white interference pigment; mica, coated with rutile (TiO$_2$) | 1.000 | 1.000 | 1.000 | 1.000 | 1.000 |
| Iriodin ® 9225 SQB Rutil Perlblau SW (from Merck), a blue interference pigment; mica, coated with rutile (TiO$_2$) | 0.060 | 0.060 | 0.060 | 0.060 | 0.060 |

TABLE 2-continued

Preparation of silver-blue waterborne basecoat
materials BL-A1 to BL-A4 and BL-B2

| Component | Designation of the waterborne basecoat material | | | | |
|---|---|---|---|---|---|
| | BL-A1 | BL-A2 | BL-A3 | BL-A4 | BL-V2 |
| | Parts by weight | | | | |
| ORGANIC PHASE | | | | | |
| Butyl glycol | 0.360 | 0.360 | 0.360 | 0.360 | 0.360 |
| Commercial aluminum pigment STAPA Hydrolux 200 (from Eckart Effect Pigments) in a solvent mixture composed of hydrogen treated naphtha, light aromatic solvent naphtha (petroleum), and butyl glycol | 0.360 | 0.360 | 0.360 | 0.360 | 0.360 |
| Hydroxy-functional polyester, prepared as per example D, page 10 of DE 4009858 C2 | 0.360 | 0.360 | 0.360 | 0.360 | 0.360 |
| 10% strength solution of N,N-dimethylethanolamine (from BASF SE) in water (for the adjustment of pH and spray viscosity) | 0.018 | 0.018 | 0.018 | 0.018 | 0.018 |

The preparation of the red, blue, carbon black pastes used has already been described under Table 1.

Comparison Between Inventive Waterborne Basecoat Materials BL-A1 to BL-A4 with the Waterborne Basecoat Materials BL-V1 and BL-V2 in Respect of Solids Content, Volume Solids, pH, and Viscosity First of all, solids content, volume solids, pH, and viscosity of the inventively prepared waterborne basecoat materials BL-A1 to BL-A4 without phyllosilicate thickener were contrasted with the standard waterborne basecoat material BL-V1, which contained a phyllosilicate thickener. As a second comparison, the waterborne basecoat material BL-V2, containing the polyurethane-urea dispersion VD4, was employed, which was likewise free from phyllosilicate thickener but which, like comparative waterborne basecoat material BL-V1, and in contrast to the inventively prepared waterborne basecoat materials, contained no inventive dispersion (PD). The results are shown in Table 3.

TABLE 3

Characterization of the comparative waterborne basecoat materials BL-V1
and BL-V2 and of the inventive waterborne basecoat materials BL-A1 to
BL-A4 in respect of solids content, volume solids, pH and viscosity

| | Waterborne basecoat material | | | | | |
|---|---|---|---|---|---|---|
| | Comparative | | Inventive | | | |
| | BL-V1 | BL-V2 | BL-A1 | BL-A2 | BL-A3 | BL-A4 |
| Polymer dispersion | VD1 | VD4 | D1 | D2 | D4 | D5 |
| Solids content in % | 17.1 | 37.6 | 36.0 | 35.8 | 35.4 | 37.8 |
| Volume solids [1] in % | 14.2 | 33.9 | 32.6 | 32.3 | 32.0 | 34.0 |
| pH (original, 23° C.) | 8.1 | 8.1 | 8.1 | 8.1 | 8.1 | 8.1 |
| Viscosity in mPa · s | | | | | | |
| at 1000 $s^{-1}$ | 73 | 83 | 81 | 80 | 82 | 82 |
| at 1 $s^{-1}$ | 3100 | 400 | 4300 | 4600 | 3900 | 2100 |
| Contains Laponite ® RD thickener solution[2] | Yes | No | No | No | No | No |

[1] Volume solids (calculated):
The volume solids was calculated according to VdL-RL 08 [German Paint Industrial Association Guideline], "Determining the solids volume of anticorrosion coating materials as basis for productivity calculations", Verband der Lackindustrie e.V., December 1999 version. The volume solids VSC (solids volume) was calculated according to the following formula, incorporating the physical properties of the relevant materials used (density of the solvents, density of the solids): VSC = (density (wet coating) × solid fraction (wet coating))/density (baked coating)
VSC volume solids content in %

Density (wet coating): calculated density of the wet coating material from the density of the individual components (density of solvents and density of solids) in g/cm$^3$ Solid fraction (wet coating): solids content (in %) of the wet coating material according to DIN EN ISO 3251 at 130° C., 60 min, initial mass 1.0 g. Density (baked coating): density of the baked coating material on the metal panel in g/cm$^3$

[2] Laponite ® RD—thickener solution:
Aqueous solution of 3% sodium lithium magnesium phyllosilicate Laponite ® RD (from Altana-Byk) and 3% Pluriol ® P900 (from BASF SE)

The results in Table 3 show that the inventive basecoat materials combine excellent rheological behavior with a very high solids content. While the viscosity under high shearing load is within the range correct for spray application, in other words a fairly low range (spray viscosity), the viscosity under low shearing load (representative for the coating material following application on the substrate) is significantly higher, providing an appropriate stability with respect in particular to runs. While the basecoat material BL-V1 has a correspondingly advantageous rheological profile, but exhibits distinct disadvantages in terms of solids content, the basecoat material BL-V2 does not possess any acceptable rheological behavior (much too low a viscosity under low shearing load).

Comparative Experiments Between the Inventive Waterborne Basecoat Materials BL-A1 to BL-A4 with the Waterborne Basecoat Materials BL-V1 and BL-V2 in Respect of Run Stability and Popping Stability, Pinholing Limit, and Number of Pinholes For the determination of the running limit, popping limit, and pinholing limit and the number of pinholes, multicoat paint systems were produced using the waterborne basecoat materials (BL-V1, BL-V2 and also BL-A1 to BL-A4). The multicoat paint systems were produced using the waterborne basecoat materials, according to the following general protocol:

A steel panel of dimensions 30 cm×50 cm coated with a cured surfacer system was provided with an adhesive strip on one longitudinal edge, ire order to be able to determine the film thickness differences after coating. The waterborne basecoat material was applied electrostatically in wedge format. The resulting waterborne basecoat film was flashed off a room temperature for one minute and subsequently dried in an air circulation oven at 70*C for 10 minutes. Applied atop the dried waterborne basecoat film was a ProGloss® two-component clearcoat material available, commercially from BASF Coatings GmbH (FF99-0345). The resulting clearcoat film was flashed off room temperature for 20 minutes. Waterborne basecoat film and clearcoat film were then jointly cured in an air circulation oven at 140° C. for 20 minutes. The film thickness of the cured clearcoat film was constant over the whole panel (±1 μm), with a clearcoat film thickness of 35 to 45 μm.

In the case of the determination of the popping limit, pinholing limit and number of pinholes, the panels were dried horizontally in an air circulation oven and cured, and the popping limit and pinholing limit were determined visually, by ascertaining the resulting film thickness of the basecoat film, increasing in wedge format, at which pops and pinholes, respectively, first occurred. In the case of the number of pinholes, furthermore, a determination was made of the number of pinholes which occurred on the coated metal panel with the edge length 30 cm×50 cm.

In the case of the determination of the running limit, perforated metal panels with the same dimensions, made from steel, were used; the panels were coated as described above, and the applied coating materials were dried and cured as described above, except that the panels were placed vertically in the oven in each case after application of waterborne basecoat material and application of clearcoat material.

The film thickness from which runs occur is termed the running limit, and was ascertained Table 4 provides an overview of the results of the determination of running limit, popping limit, pinholing limit, and number of pinholes:

Whereas waterborne basecoat material BL-V1 contained a Laponite® RD phyllosilicate thickener, all of the other waterborne basecoat materials were free from this thickener component.

While the comparative waterborne basecoat materials BL-V1 and BL-V2 had no crosslinked particles, the inventively prepared waterborne basecoat materials BL-A1 to BL-A4 contained inventive dispersions (PD).

TABLE 4

Results of the determination of running limit, popping limit, pinholing limit, and number of pinholes for multicoat paint systems based on the waterborne basecoat materials BL-A1 to BL-A4 and BL-B1 to BL-B2

| | Comparative | | Inventive | | | |
| --- | --- | --- | --- | --- | --- | --- |
| | Waterborne basecoat material | | | | | |
| | BL-V1 | BL-V2 | BL-A1 | BL-A2 | BL-A3 | BL-A4 |
| | | | Polyurethane dispersion | | | |
| | VD1 | VD4 | D1 | D2 | D4 | D5 |
| Contains Laponite ® RD thickener solution[1] | Yes | No | No | No | No | No |
| Running limit in μm [2] | 23 | 8 | >60 | >60 | >60 | >60 |
| Popping limit in μm [3] | 12 | 14 | 39 | 40 | 35 | 31 |
| Pinholing limit in μm [4] | 16 | 13 | 36 | 36 | 36 | 30 |
| Number of pinholes [5] | 17 | >100 | 12 | 15 | 14 | 20 |

[1] Laponite ® RD thickener solution: Aqueous solution of 3% sodium lithium magnesium phyllosilicate Laponite ® RD (from Altana-Byk) and 3% Pluriol ® P900 (from BASF SE)
[2] Running limit in μm: Film thickness from which runs occur
[3] Popping limit in μm: Film thickness from which runs occur
[4] Pinholing limit in μm: Film thickness of the basecoat film from which pinholes occur following application of a wedge of basecoat material and a constant layer of a two-component clearcoat material, with joint curing in an air circulation oven at 140° C., 20 minutes
[5] Number of pinholes: Number of pinholes from pinholing limit of the coated metal panel with edge length 30 cm × 50 cm The results show that the use of the inventive dispersions (PD) in the waterborne basecoat materials BL-A1 to BL-A4 for producing multicoat paint systems, in comparison to the use of the waterborne basecoat materials BL-V1 and BL-V2, exhibits distinct advantages in respect of all the optical properties evaluated.

Comparative Experiments Between the Inventive Waterborne Basecoat Materials BL-A1 to BL-A4 with the Waterborne Basecoat Materials BL-V1 and BL-V2 in Relation to Adhesion Properties on the Basis of Cross-Cut and Stonechip Results For the determination of the adhesion properties, multicoat paint systems were produced with the comparative waterborne basecoat materials BL-V1 and BL-V2 and with the inventive waterborne basecoat materials BL-A1 to BL-A4 in accordance with the following general protocol:

Original Finish

The substrate used was a metal panel with dimensions of 10 cm×20 cm, which had a cured surfacer system produced from a commercial surfacer, with a film thickness of 30±3 µm. In the production of this substrate, the surfacer was subjected to intermediate drying at 80° C. over a period of 10 minutes and then baked at 150° C./14 minutes or alternatively at 190° C./30 minutes. In each case, to these differently baked substrates, the waterborne basecoat material was initially applied pneumatically with a target film thickness of 14±2 µm. After the waterborne basecoat material had been flashed off at room temperature for 1 min, it was subjected to intermediate drying in an air circulation oven at 70° C. for 10 minutes. Then the ProGloss® two-component clearcoat material available commercially from BASF Coatings GmbH (FF99-0345) was applied, likewise pneumatically, with a target film thickness of 40±5 µm, and, after flashing off for 20 minutes at room temperature, basecoat and clearcoat were baked jointly at 125° C./20 minutes (underbaked original finish) or alternatively at 160° C./30 minutes (overbaked original finish) in an air Circulation oven. This gave multicoat paint systems produced according to production conditions 1 or 2 (see Table 5.1).

Refinish

Over the original finish (overbaked and underbaked), after cooling to room temperature all the waterborne basecoat material was applied pneumatically again, with a target thickness of 14±2 µm, and, after 1 minute of flashing off at room temperature, the waterborne basecoat material was subjected to intermediate drying in an air circulation oven at 70° C. for 10 minutes. Then the ProGloss® two-component clearcoat material available commercially from BASF Coatings GmbH (FF99-0345) was applied, likewise pneumatically, with a target film thickness of 40±5 µm, and, after flashing off for 20 minutes at room temperature, basecoat and clearcoat were baked jointly at 125° C./20 minutes (underbaked refinish) or alternatively at 160'C/30 minutes (overbaked refinish) in an air circulation oven.

This gave in each case an overbaked or underbaked dual finish, which is referred to below as overbaked or underbaked refinish or else as multicoat paint systems produced according to production conditions 3 and 4 (see Table 5.1).

Table 5.1 again brings together t differences between the individual multicoat systems in terms of the production conditions, especially baking conditions.

TABLE 5.1

Production conditions for the multicoat systems on metal panels 1 to 4

| Production conditions | | Surfacer | | Multicoat system Basecoat material/ Clearcoat material | | Basecoat material/ Clearcoat material | |
|---|---|---|---|---|---|---|---|
| 1 | Original finish (underbaked) | 150° C. | 14 min | 125° C. | 20 min | | |
| 2 | Original finish (overbaked) | 190° C. | 30 min | 160° C. | 30 min | | |
| 3 | Refinish (underbaked) | 150° C. | 14 min | 125° C. | 20 min | 125° C. | 20 min |
| 4 | Refinish (overbaked) | 190° C. | 30 min | 160° C. | 30 min | 160° C. | 30 min |

To assess the adhesion properties of these multicoat paint systems, they were subjected to the cross-cut and stonechip tests.
The cross-cut test was carried out according to DIN 2409 on unexposed samples. The results of the cross-cut test were assessed according to DIN EN ISO 2409 (rating 0 to 5; 0 = best score, 5 = worst score).
The stonechip test was carried out according to DIN EN ISO 20567-1, method B. The results of the stonechip test were assessed according to DIN EN ISO 20567-1 (values ≤1.5 satisfactory, values >1.5 unsatisfactory).

In Table 5.2 the results of the cross-cut and stonechip tests have been compiled.

TABLE 5.2

Results of cross-cut and stonechip test on underbaked and overbaked original finishes and refinishes of the waterborne basecoat materials BL-V1 and BL-V2 in comparison to the inventive waterborne basecoat materials BL-A1 to BL-A4

| | | Comparative | | Inventive | | | |
|---|---|---|---|---|---|---|---|
| | | Waterborne basecoat material | | | | | |
| | | BL-V1 | BL-V2 | | | | |
| | | Polyurethane dispersion | | | | | |
| Production conditions | Testing | VD1 | VD4 *) | BL-A1 D1 | BL-A2 D2 | BL-A3 D4 | BL-A4 D5 |
| 1 | Cross-cut (rating)[1] | 0 | Not coatable | 0 | 0 | 0 | 0 |

TABLE 5.2-continued

Results of cross-cut and stonechip test on underbaked and overbaked original finishes and refinishes of the waterborne basecoat materials BL-V1 and BL-V2 in comparison to the inventive waterborne basecoat materials BL-A1 to BL-A4

| | | Comparative | | Inventive | | | |
|---|---|---|---|---|---|---|---|
| | | Waterborne basecoat material | | | | | |
| | | BL-V1 | BL-V2 | | | | |
| | | Polyurethane dispersion | | | | | |
| Production conditions | Testing | VD1 | VD4 *) | BL-A1 D1 | BL-A2 D2 | BL-A3 D4 | BL-A4 D5 |
| 1 | Stonechip test. (rating)[2] | 1.0 | due to runs forming | 1.5 | 1.0 | 1.5 | 1.5 |
| 2 | Cross-cut (rating)[1] | 0 | | 0 | 0 | 1 | 0 |
| 2 | Stonechip test (rating)[2] | 1.5 | | 1.5 | 1.5 | 1.5 | 1.5 |
| 3 | Cross-cut (rating)[1] | 0 | | 0 | 0 | 0 | 0 |
| 3 | Stonechip test (rating)[2] | 1.5 | | 1.5 | 1.0 | 1.5 | 1.5 |
| 4 | Cross-cut (rating)[1] | 1 | | 0 | 0 | 1 | 0 |
| 4 | Stonechip test (rating)[2] | 1.5 | | 1.5 | 1.5 | 1.5 | 1.5 |

*) The comparative basecoat material BL-V2 was uncoatable owing to formation of runs.
[1] Cross-cut test:
The cross-cut test was carried out according to DIN 2409 on unexposed samples.
The results of the cross-cut test were assessed according to DIN EN ISO 2409.
(Rating 0 to 5; 0 = best score, 5 = worst score):
Cross-cut ≤1: Satisfactory
Cross-cut >1: Unsatisfactory
[2] Stonechip test on underbaked and overbaked original finishes and refinishes (see Table 5.1).
For this purpose, the stonechip test of DIN EN ISO 20567-1, method B, was carried out.
The results of the stonechip test were assessed according to DIN EN ISO 20567-1:
Stonechipping ≤1.5: Satisfactory
Stonechipping >1.5: Unsatisfactory The results confirm that the use of inventive polyurethane-polyurea microgel dispersions in waterborne basecoat materials without phyllosilicate thickeners does not carry any adhesion problems. Instead, a level of adhesion is achieved that is of comparable quality to, and in some cases even an improvement on, that of multicoat paint systems produced using the standard waterborne basecoat material BL-V1 with phyllosilicate thickener.

Comparison of the Inventive Silver-Blue Waterborne Basecoat Materials BL-A1 and BL-A2 with the Standard Waterborne Basecoat Material BL-V1 Containing phyllosilicate Thickener, Applied Directly as Coloring Coat to a Cured Surfacer, in Respect of Angle-Dependent Hue Values For the determination of the angle-dependent hue values resulting from the various waterborne basecoat materials, multicoat paint systems were produced according to the following general protocol;

A steel panel with dimensions of 10×20 cm, coated with a standard cathodic electrocoat (Cathoguard® 500 from BASF Coatings GmbH), was coated with a standard surfacer (SecuBloc medium gray from BASF Coatings GmbH) with a target film thickness of 25-35 µm. After flashing off at room temperature 10 minutes and also after intermediate drying of the aqueous surfacer over a period of 10 minutes at 70° C., it was baked at a temperature of 160° C. over a period of 30 minutes.

The waterborne basecoat materials BL-A1, BL-A2 and BL-V1 were applied by dual application to the steel panels coated as described above. Application in the first step was electrostatic with a target film thickness of 8-11 µm: in the second step, after a flash-off time of 3 minutes and 40 seconds at room temperature, coating took place pneumatically with a target film thickness of 3-5 µm. Subsequently, after a further flash-off time of 4 minutes and 30 seconds at room temperature, the resulting waterborne basecoat film was dried in an air circulation oven at 70° C. for 5 minutes.

Applied atop the dried waterborne basecoat film was a ProGloss® two-component clearcoat material available commercially from BASF Coatings GmbH (FF99-0345). The resulting clearcoat film was flashed off at room temperature for 20 minutes. Waterborne basecoat film and clearcoat film were then jointly cured in an air circulation oven at 140° C. for 20 minutes. The film thickness of the cured clearcoat was constant over the entire panel (±1 µm) with a clearcoat film thickness of 40 to 45 µm.

The multicoat paint systems obtained accordingly were measured using an X-Rite spectrophotometer (X-Rite MA68 Multi-Angle Spectrophotometer). The surface is illuminated with a light source, and spectral detection in the visible range is carried out at different angles.

The spectral measurements obtained in this way can be used, taking into account the standardized spectral values and also the reflection spectrum of the light source used, to calculate color values in the CIE L*a*b* color space, where L* characterizes the lightness, a* the red-green value, and b* the yellow-blue value. This method is described, for materials comprising metal flakes, in ASTM E2194-12.

Table 6 reports the respective hue values for the various coating materials, utilizing the values of BL-V1 as reference. The values reported are CIE L*a*b*values.

TABLE 6

Color values of multicoat paint systems produced using the standard waterborne basecoat material BL-V1 (reference) and the waterborne basecoat materials BL-A1 and BL-A2.

|  |  | Waterborne basecoat material | | |
| --- | --- | --- | --- | --- |
|  |  | BL-V1 | BL-A1 | BL-A2 |
| Inventive |  | No | Yes | Yes |
| Laponite ® RD |  | Yes | No | No |
| Polyurethane microgel |  | No | Yes | Yes |
| Color values[1)] | Measurement angle |  |  |  |
| ΔL* | 15° | 0 | −0.27 | −0.41 |
|  | 25° | 0 | −0.12 | −0.19 |
|  | 45° | 0 | 0.07 | −0.01 |
|  | 75° | 0 | 0.25 | 0.10 |
|  | 110° | 0 | 0.31 | 0.27 |
| Δa* | 15° | 0 | −0.02 | 0.10 |
|  | 25° | 0 | 0.00 | 0.06 |
|  | 45° | 0 | 0.00 | 0.05 |
|  | 75° | 0 | 0.07 | 0.09 |
|  | 110° | 0 | −0.13 | 0.08 |
| Δb* | 15° | 0 | 0.07 | 0.07 |
|  | 25° | 0 | 0.00 | 0.00 |
|  | 45° | 0 | −0.02 | −0.03 |
|  | 75° | 0 | −0.07 | 0.08 |
|  | 110° | 0 | −0.06 | 0.10 |

[1)]Angle-dependent color values in the CIE L*a*b* color space:
L* = lightness
ΔL* = color difference – difference between L* of the standard and L* of the article under test
a* = red-green value
Δa* = color difference – difference between a* of the standard and a* of the article under test
b* = yellow-blue value
Δb* = color difference – color difference between b* of the standard and b* of the article under test
A description is given of the method in ASTM E2194-12 for materials comprising metal flake The hue values of the inventive waterborne basecoat materials are virtually identical with those of the standard waterborne basecoat material; the deviations reside in fluctuation ranges arising during coating operations. All multicoat paint systems have a similar visual appearance were free from any defects.

The invention claimed is:

1. A process for preparing an aqueous polyurethane-polyurea dispersion, said process comprising, in the following order:
    dispersing, in an aqueous phase, a composition comprising, based in each case on the total amount of the composition 15 to 65 wt % of at least one intermediate comprising at least one isocyanate group and at least one blocked primary amino group, and 35 to 85 wt % of at least one organic solvent which has a solubility in water of not more than 38 wt % at a temperature of 20° C., thereby obtaining a dispersion wherein the polymer dispersion comprises molecules that are intramolecularly crosslinked between an amino group and an isocyanate group, and
    at least partly removing the at least one organic solvent from the dispersion,
    thereby obtaining an aqueous polyurethane-polyurea dispersion comprising polyurethane-polyurea particles having an average particle size of 40 to 2000 nm and a gel fraction of at least 50%,
    wherein the at least one intermediate is prepared by a process comprising a reaction of
        at least one polyurethane prepolymer comprising isocyanate groups and comprising anionic groups and/or groups which can be converted into anionic groups, with
        at least one polyamine comprising at least two blocked primary amino groups and at least one free secondary amino group,
    by addition reaction of isocyanate groups from the at least one polyurethane prepolymer with free secondary amino groups from the at least one polyamine.

2. A method for producing a multicoat paint system, the method comprising:
    (1) applying a pigmented aqueous basecoat material to a substrate, thereby obtaining a coating material,
    (2) forming a polymer film from the coating material, thereby obtaining a basecoat film,
    (3) applying a clearcoat material to the basecoat film, thereby obtaining a clearcoat film on the basecoat film, and then (4) curing the basecoat film together with the clearcoat film,
    wherein the pigmented aqueous basecoat material comprises an aqueous polyurethane-polyurea dispersion comprising polyurethane-polyurea particles present in the dispersion, having an average particle size of 40 to 2000 nm and having a gel fraction of at least 50%,
    wherein the dispersion is obtained by
    dispersing, in an aqueous phase, a composition comprising, based in each case on the total amount of the composition, 15 to 65 wt % of at least one intermediate comprising isocyanate groups and blocked primary amino groups, and 35 to 85 wt % of at least one organic solvent which has a solubility in water of not more than 38 wt % at a temperature of 20° C., thereby obtaining a dispersion wherein the polymer dispersion comprises molecules that are intramolecularly crosslinked between an amino group and an isocyanate group, and
    at least partly removing the at least one organic solvent from the dispersion,
    wherein the at least one intermediate is prepared by a process comprising a reaction of
        at least one polyurethane prepolymer containing isocyanate groups and comprising anionic groups and/or groups which can be converted into anionic groups, with
        at least one polyamine comprising at least two blocked primary amino groups and at least one free secondary amino group,
    by addition reaction of isocyanate groups from the at least one polyurethane prepolymer with free secondary amino groups from the at least one polyamine.

3. A multicoat paint system produced by the method of claim 2.

4. The method of claim 2, wherein the pigmented aqueous basecoat material has a solids content of 30% to 50%.

5. The method of claim 2, wherein the pigmented aqueous basecoat material further comprises a melamine resin and at least one hydroxy-functional polymer which is different from the polymer present in the dispersion.

6. The method of claim 2, wherein the at least one polyurethane prepolymer comprises carboxylic acid groups.

7. The method of claim 2, wherein the blocked primary amino groups of the at least one polyamine are blocked with ketones.

8. The method of claim 2, wherein the at least one polyamine comprises one or two free secondary amino groups and two blocked primary amino groups.

9. The method of claim 8, wherein the at least one polyamine consists of one or two free secondary amino groups, two blocked primary amino groups, and aliphatically saturated hydrocarbon groups.

10. The method of claim 2, wherein, in the reaction of the at least one prepolymer with the at least one polyamine, the molar amounts of isocyanate groups from the at least one prepolymer and amino groups from the at least one polyamine satisfy a condition [n (isocyanate groups from the at least one prepolymer)–n (free secondary amino groups from the at least one polyamine)]/n (blocked primary amino groups from the at least one polyamine)=1.2/1 to 4/1.

11. The method of claim 2, wherein the fraction of the at least one intermediate in the composition is from 35 to 52.5 wt %.

12. The method of claim 2, wherein the at least one organic solvent is methyl ethyl ketone.

13. The method of claim 2, wherein the aqueous polyurethane-polyurea dispersion comprises 25 to 55 wt % of a polyurethane-polyurea polymer of the polyurethane-polyurea particles and 45 to 75 wt % of water, and wherein a total fraction of polyurethane-polyurea polymer and water is at least 90 wt %.

14. The method of claim 2, wherein the composition has a total content of less than 10% of N-methyl-2-pyrrolidone, dimethylformamide, dioxane, tetrahydrofuran, and/or N-ethyl-2-pyrrolidone, or wherein the composition does not comprise any of N-methyl-2-pyrrolidone, dimethylformamide, dioxane, tetrahydrofuran, and N-ethyl-2-pyrrolidone.

15. The method of claim 2, wherein the at least one intermediate comprises molecules which comprise isocyanate groups and blocked primary amino groups in a single molecule, and wherein the polymer dispersion comprises molecules that are intramolecularly crosslinked between a primary amino group and an isocyanate group.

* * * * *